United States Patent
Oliveti et al.

(10) Patent No.: US 6,603,598 B1
(45) Date of Patent: Aug. 5, 2003

(54) OPTICAL AMPLIFYING UNIT AND OPTICAL TRANSMISSION SYSTEM

(75) Inventors: Guido Oliveti, Turin (IT); Giacomo Rossi, Milan (IT); Valeria Giuseppina Gusmeroli, Milan (IT); Giovanni Sacchi, Milan (IT); Fabrizio Di Pasquale, Milan (IT)

(73) Assignee: Corning O.T.I. Inc., Dover, DE (US)

( * ) Notice: Subject to any disclaimer, the term of this patent is extended or adjusted under 35 U.S.C. 154(b) by 0 days.

(21) Appl. No.: 09/671,974

(22) Filed: Sep. 28, 2000

Related U.S. Application Data
(60) Provisional application No. 60/158,247, filed on Oct. 8, 1999.

(30) Foreign Application Priority Data

Sep. 29, 1999 (EP) .............................. 99119318

(51) Int. Cl.⁷ ................ H04B 10/12; H01S 3/30
(52) U.S. Cl. ............... 359/341.5; 359/343; 359/341.31; 372/6
(58) Field of Search .............. 359/341.5, 341.3, 359/341.31, 343; 372/6

(56) References Cited

U.S. PATENT DOCUMENTS

| | | | |
|---|---|---|---|
| 5,225,925 A | | 7/1993 | Grubb et al. ............... 359/341 |
| 5,291,501 A | | 3/1994 | Hanna .......................... 372/6 |
| 5,341,237 A | * | 8/1994 | Tohmon ...................... 359/341 |
| 5,500,764 A | | 3/1996 | Armitage et al. ........... 359/341 |
| 5,594,747 A | | 1/1997 | Ball ............................ 372/31 |
| 5,696,782 A | * | 12/1997 | Hartner ....................... 372/25 |
| 5,731,892 A | * | 3/1998 | DiGiovanni ................ 359/341 |
| 5,768,012 A | | 6/1998 | Zanoni et al. .............. 359/341 |
| 5,856,882 A | * | 1/1999 | Yanagita ..................... 359/341 |
| 5,867,305 A | * | 2/1999 | Waarts ........................ 359/341 |
| 5,920,423 A | * | 7/1999 | Grubb ......................... 359/341 |
| 5,953,353 A | * | 9/1999 | Headley ...................... 372/6 |
| 6,043,930 A | * | 3/2000 | Inagaki ....................... 359/341 |
| 6,275,250 B1 | * | 8/2001 | Sanders ....................... 347/247 |

FOREIGN PATENT DOCUMENTS

| | | | |
|---|---|---|---|
| DE | 0 802 592 A2 | * 10/1997 | ............... 372/6 |
| EP | 0 533 324 A2 | 3/1993 | |
| EP | 0 803 944 A2 | 10/1997 | |
| EP | 0 858 976 A2 | 8/1998 | |
| EP | 0 964 275 A1 | 12/1999 | |
| WO | 95/10868 | 4/1995 | |

OTHER PUBLICATIONS

Barbier, D. et al. "Amplifying Four–Wavelength Combiner, Based on Erbium/Ytterbium–Doped Waveguide Amplifiers and Integrated Splitters." IEEE Photonics Tech. Lett. vol. 9, No. 3, Mar. 1997, pp. 315–317.*

Kringlebotn, J.T. et al. "Highly efficient. low noise grating feedback Er3+:Yb3+ codoped fibre laser." Elect. Lett. June 1994, vol. 30, No. 12, pp. 972–973.*

(List continued on next page.)

Primary Examiner—Thomas G. Black
Assistant Examiner—Andrew R. Sommer
(74) Attorney, Agent, or Firm—Svetlana Z. Short; Jennifer P. Medlin

(57) ABSTRACT

An optical amplifying unit includes an input for the input optical signals and an output for the output of the optical signals. A single-mode active fiber codoped with Er and Yb is optically connected to the input and the output and adapted to amplify the optical signals. A first pump source generates a first pump radiation including an excitation wavelength for Er, and a second pump source for generates a second pump radiation including an excitation wavelength for Yb. A first optical coupler optically couples the first pump radiation into the core of the active fiber in a co-propagating direction with respect to signal direction, and a second optical coupler optically couples the second pump radiation into the core of the active fiber in a counter-propagating direction with respect to signal direction.

56 Claims, 17 Drawing Sheets

OTHER PUBLICATIONS

Grubb, S.G. et al. "+24.6 dBm Output power Er/Ybcodoped optical amplifier pumped by diode–pumped Nd: YLF laser." Elect Lett. vol. 28, No. 13, 1275–1276.*

Kurkov, A.S. "Photosensitive Yb–Doped Double–clad fiber for fiber lasers." OFCC 1999. pp. 205–207.*

Chernikov, S.V. et al. "1083 nm ytterbium doped fibre amplfier for optical pumping of erbium." Elect. Lett. Apr. 24, 1997, vol. 33. No. 9, pp. 787–789.*

Karasek, M. "Optimum Design of Er3+—Yb3+ Codoped Fibers for Large–Signal High–Pump–Poewr Applications." IEEE J. Quantum Elect. vol. 33, No. 10, Oct. 1997. pp. 1699–1705.*

Paschotta, R et al. "Ytterbium–Doped Fiber Amplifiers." IEEE J. Quantum Elect. vol. 33, No. 7, Jul. 1999. pp. 1049–1056.*

Laporta, P. et al "High–Power and High–Efficiency Diode–Pumped Er:Yb: glass laser." Elect. Lett. Feb. 27 1992, pp. 490–491.*

Yamashita, S. et al. "Performance of Single–Frequency Minature Fiber Fabry–Perot Laser (FFPL) with Self–Injection Locking." CLEO, 1999. pp. 509–510.*

Grudinin, A.B., et al. "Single Clad Coiled Optical Fibre for High Power Lasers and Amplifiers,", CLEO 1999. pp. CPD26–1 —CPD26–2.*

Kirchhof, J. and Unger, S. "Codoping Effects in Fibers for Active Applications." OFCC 1999. pp. 196–198.*

Grubb, S.G. et al., "+24.6 dBm Output Power Er/Yb Codoped Otpical Amplifier Pumped by Diode–Pumped Nd: YLF Laser", Electronics Letters, vol. 28, No. 13, pp. 1275–1276, (1992).

Minelly, J.D. et al., "Diode–Array Pumping of $Er^{3+}/Yb^{3+}$ Co–Doped Fiber Lasers and Amplifiers", IEEE Photonics Technology Letters, vol. 5, No. 3, pp. 301–303 (1993).

Maker, G.T. et al., "1.56 $\mu$m Yb–Sensitised Er Fibre Laser Pumped by Diode–Pumped Nd: Yag and Nd: YLF Lasers", Electronics Letters, vol. 24, No. 18, pp. 1160–1161 (1988).

Masuda, H., et al. "Wideband, gain–flattened, Erbium–doped Fibre Amplifiers with 3dB bandwidths of >50nm", Electronics Letters, vol. 33, No. 12, pp. 1070–1072, (1997).

Ono, H., et al. "Gain–Flattened $Er^{3+}$–Doped Fiber Amplifier for a WDM signal in the 1.57–1.60-$\mu$m Wavelength Region", IEEE Photonics Technology Letters, vol. 9, No. 5, pp. 596–598, (1997).

Jolley N.E., et al. "Demonstration of low PMD and Negligible Multipath Interference in an Ultra Flat Broad Band EDFA Using a Highly Doped Erbium Fibre", Optical Amplifiers and Their Applications Conference, Vail, Colorado, pp. 124–127 (1998).

* cited by examiner

OPTICAL AMPLIFYING UNIT AND OPTICAL TRANSMISSION SYSTEM

This application claims the benefit of U.S. Provisional Application No. 60/158,247, filed Oct. 8, 1999, and claims the right to priority based on European Application No. 99 119318.6, filed Sep. 29, 1999, the content of both of which is incorporated herein by reference.

BACKGROUND

It is an object of the present invention to provide an optical amplifying unit to be used for optical telecommunications. The invention also relates to an optical transmission system, more particularly a wavelength division multiplexing (WDM) optical transmission system, which uses the above-mentioned optical amplifying unit. The optical amplifying unit of the invention is also adapted to be used in analog CATV systems.

In WDM optical transmission systems, transmission signals including several optical channels are sent over a same line, that can include one or more optical amplifiers, by means of wavelength division multiplexing. The transmitted channels may be either digital or analog and are distinguishable because each of them is associated with a specific wavelength.

Present-day long-distance high-capacity optical transmission systems use optical fiber amplifiers that, differently from previously used electronic regenerators, do not need DE/EO conversion. An optical fiber amplifier includes an optical fiber of preset length, having the core doped with one or more rare earths so as to amplify optical signals by stimulated emission when excited by pump radiation. This pump radiation, when injected into the active fiber, excites the ions of the rare earth element, leading to gain in the core for an information bearing signal propagating along the fiber.

Rare earth elements used for doping typically include Erbium (Er), Neodymium (Nd), Ytterbium (Yb), Samarium (Sm), Thulium (Tm) and Praseodymium (Pr). The particular rare earth element or elements used is determined in accordance with the wavelength of the input signal light and the wavelength of the pump light. For example, Er ions would be used for input signal light having a wavelength of 1.55 $\mu$m and for pump power having a wavelength of 1.48 $\mu$m or 0.98 $\mu$m; co-doping with Er and Yb ions, further, allows different and broader pump wavelength bands to be used.

Optical fibers doped with erbium (Er) have been developed for use as both optical amplifiers and lasers. These devices are of considerable importance since their operating wavelength coincides with the third window for optical fiber communications, around 1550 nm. EP patent application Ser. No. 98110594.3 in the name of the Applicant proposes a thirty-two channels WDM optical transmission have optical characteristics that allow, in addition to the required wavelength selectivity, a predetermined spatial distribution of the light. If a micro-optic coupler is used, a focusing lens system able to provide the considered spatial distribution of the light is very difficult to implement. Therefore, the use of a double-cladding active fiber involves difficulties in achieving a high coupling efficiency between the pump source and the active fiber. Moreover, the considered micro-optic coupler has a relatively high insertion loss, greater than 1 dB at 1550 nm. system that uses erbium-doped fiber amplifiers (EDFAs) in the wavelength bands 1529–1535 nm and 1541–1561 nm.

Several methods have been proposed to improve the system performances, for example in terms of amplification gain and amplification bandwidth.

One technique for improving the system performances consists in co-doping an erbium-doped amplification fiber with ytterbium (Yb). Co-doping an active fiber with erbium and ytterbium not only broadens the pump absorption band from 800 nm to 1100 nm, offering greater flexibility in selection of the pump wavelength, but also greatly increases the ground state absorption rate due to the higher absorption cross section and dopant solubility of ytterbium. The ytterbium ions absorb much of the pump light and the subsequent cross relaxation between adjacent ions of erbium and ytterbium allows the absorbed energy to be transferred to the erbium system. As described in Grubb et al., "+24.6 dBm output power Er/Yb co-doped optical amplifier pumped by diode-pumped Nd:YLF laser", Electronics Letters, 1992, 28, (13) pp. 1275–1276, and in Maker, Ferguson, "1.56 $\mu$m Yb-sensitized Er fibre laser pumped by diode-pumped Nd:YAG and Nd:YLF lasers", Electronics Letters, 1988, 24, (18), pp. 1160–1161, the co-doping technique may be applied to efficiently excite fiber amplifiers and lasers through direct pumping in the long wavelength tail of ytterbium absorption spectrum. This pumping is preferably performed by means of diode-pumped solid state lasers, for example 1047 nm Nd:YLF lasers or 1064 nm Nd:YAG lasers.

Using an erbium and ytterbium co-doped amplification fiber to amplify communication signals is further described in EP 0 803 944 A2 and in U.S. Pat. No. 5,225,925. EP 0 803 944 A2 refers to a multistage Er-doped fiber amplifier (EDFA) operating in the wavelength band 1544–1562 nm and comprising a first stage that includes Er and Al and a second stage that includes Er and a further rare earth element, for example Yb. Such multistage EDFA can have advantageous characteristics in the cited wavelength band over the all-erbium amplification systems, e.g. a relatively wide flat gain region, and relatively high output power, without significant degradation of the noise figure. However, the Applicant noted that the amplifier proposed in EP 0 803 944 A2 offers no advantages in terms of number of transmitted channels, the amplification bandwidth being still limited to the relatively narrow (and largely exploited) 1544–1562 nm band. Furthermore, the Er/Yb second stage is pumped by means of a diode-pumped Nd-doped fiber laser emitting at 1064 nm. This pump source, largely used for the excitation of mono-modal amplification fiber, is relatively expensive and bulky.

U.S. Pat. No. 5,225,925 relates to an optical fiber for amplifying or sourcing a light signal in a single transverse mode. The fiber comprises a host glass doped with erbium (Er) and a sensitizer such as ytterbium (Yb) or iron (Fe). Preferably the host glass is a doped silica glass (e.g. phosphate or borate doped). The Applicant noted that U.S. Pat. No. 5,225,925 proposes an amplification fiber that, due to the shape of its gain curve, is particularly adapted for the transmission of a single channel at 1535 nm but is not suitable for WDM transmissions. Moreover, such an amplification fiber is adapted to be pumped, for the excitation of Yb ions, by means of a diode-pumped Nd-doped fiber laser that has the above mentioned disadvantages.

Neither EP 0 803 944 A2 nor U.S. Pat. No. 5,225,925 address amplification by an Er/Yb co-doped optical amplifier of a signal in a wavelength band different from the transmission band around 1550 nm.

An improvement of Er/Yb amplification fibers has been obtained by means of the cladding pumping technique, which consist in pumping the active fiber in an inner cladding region surrounding the core, instead that directly in the core. Cladding pumping is a technique that allows high power broadstripe diodes and diode bars to be employed as efficient, low cost and small dimension pump sources for double-cladding rare earth doped single-mode fibers. Output powers ranging from several hundred milliwatts to several tens of watts may be attained by this technique. A double-cladding Er/Yb fiber pumped by diode arrays at 980 nm is described, for example, in Minelly et al., "Diode-array pumping of $Er^{3+}/Yb^{3+}$ co-doped fibre lasers and amplifiers", IEEE Photonics Technology Letters, 1993, 5, (3), pp. 301–303. The erbium-ytterbium co-doped scheme enables much higher ground state absorption for erbium in the band about 980 nm than singly-doped erbium fibers, resulting in much shorter optimum length.

The technique of inserting the pump radiation into a portion of the fiber external to the core (which can be identically identified as an inner cladding or an outer core) is also described, for example, in PCT patent application WO 95/10868. This document discloses a fiber optic amplifier comprising a fiber with two concentric cores. Pump power provided by multi-mode sources couples transversely to the outer core (equivalent to an inner cladding) of the fiber through multi-mode fibers and multi-mode optical couplers. The pump power propagates through the outer core and interacts with the inner core to pump active material contained in the inner core. This pumping technique is also described in U.S. Pat. No. 5,291,501, which illustrates a mono-mode optical fiber with doped core and doped inner cladding.

Several methods have also been proposed to increase the number of channels to be transmitted. One way to increase channel numbers is to narrow the channel spacing. However, narrowing channels spacing worsens nonlinear effects such as cross-phase modulation or four wave mixing, and makes accurate wavelength control of the optical transmitters necessary. Applicant has observed that a channel spacing lower than 50 GHz is difficult to achieve in practice due to the above reasons.

Another way to increase the channel number is to widen the usable wavelength bandwidth in the low loss region of the fiber. One key technology is optical amplification in the wavelength region over the conventional 1550 nm transmission band. In particular, the high wavelength band around 1590 nm, in particular between 1565 nm and 1620 nm, is a very promising band for long-distance optical transmissions, in that a very high number of channels can be allocated in that band. If the optical amplifier for the 1565–1620 nm band must deal with a high number of channels, the spectral gain characteristics of such amplifier are fundamental to optimize the system's performances and costs. The use of the transmission wavelength region around 1590 nm in parallel to the 1530 and 1550 wavelength regions of erbium-doped fiber amplifiers, is attractive and has been recently considered. As an additional advantage, by employing the 1590 nm wavelength region it is possible to use dispersion-shifted fiber (DSF) for WDM transmissions without any degradation caused by four-wave mixing.

Several articles in the patent and non-patent literature address amplification in the high wavelength transmission band (from 1565 nm up to 1620 nm). All these documents consider only erbium-doped fiber amplifiers.

The following documents propose several methods to enlarge the usable bandwidth to the high wavelength transmission band.

U.S. Pat. No. 5,500,764 relates to a $SiO_2$—$Al_2O_3$—$GeO_2$ single-mode optical fiber (having a length between 150 m and 200 m) doped with erbium, pumped by 1.55 μm and 1.47 μm optical sources and adapted to amplify optical signals between 1.57 μm and 1.61 μm.

Ono et al., "Gain-Flattened $Er^{3+}$-Doped Fiber Amplifier for a WDM Signal in the 1.57–1.60 μm Wavelength Region", IEEE PHOTONICS TECHNOLOGY LETTERS, Vol. 9, No. 5, May 1997, pp. 596–599, disclose a gain-flattened $Er^{3+}$-doped silica-based fiber amplifier for the 1.58 μm band WDM signal; different fiber lengths were tested and the authors found that 200 m was the optimum length of EDF (Erbium-Doped Fiber) for constructing an EDFA with high gain and low noise.

Masuda et al., "Wideband, gain-flattened, erbium-doped fibre amplifiers with 3 dB bandwidths of >50 nm", ELECTRONICS LETTERS, $5^{th}$ June 1997, Vol. 33, No. 12, pp. 1070–1072, propose a scheme with two-stage erbium-doped fibres and an intermediate equalizer, obtaining a 52 nm band (1556–1608 nm) for a silicate erbium-doped fiber amplifier and a 50 nm band (1554–1604 nm) for a fluoride erbium-doped fiber amplifier; in the case of a silicate erbium-doped fiber amplifier, the two stages include a 50 m EDF and a 26 m EDF, respectively.

Jolley et al., "Demonstration of low PMD and negligible multipath interference in an ultra flat broad band EDFA using a highly doped erbium fiber", "Optical Amplifiers and their Applications" Conference, Vail, Colorado, Jul. 27–29 1998, TuD2-1/124–127 proposes a broad band EDFA which amplifies signals in the 1585 nm band using 45 m of erbium fiber and reaching a maximum external power of more than +18.3 dBm at 1570.

The Applicant has observed that a conventional line EDFA adapted to amplify optical signals in the high wavelength band can tipically amplify an optical signal having a total input power of approximately −10 dBm to a maximum power value lower than 19 dBm, i.e. with a maximum gain of approximately 29 dB. A total input power of approximately −10 dBm is a proper reference value, being typical for optical amplifiers in long-distance transmission systems. Lower input power are not recommended in that, although EDFAs have higher gains for low power input signals than for high power input signals, the ASE (amplified spontaneous emission) in this case increases to values such that the signal to noise ratio becomes too low. On the contrary, signal input powers over −10 dBm, obtainable for example to the detriment of transmission fiber length, tends to saturate the gain, leading to an undesirable waste of energy. An optical transmission system using EDFAs and transmitting sixty-four channels between 1575 nm and 1602 nm would provide a maximum power per channel, at the output of the line EDFAs, of about 0.2 dBm and would limit in practice the maximum span length to less than 100 km.

The Applicant has further observed that in an erbium-doped active fiber of a predetermined length, the curve of the gain vs. erbium concentration has an increase up to a maximum, corresponding to an optimum value of erbium concentration, and then a decrease. Higher gains are obtainable only increasing the length of the active region doped with erbium, i.e. increasing the active fiber length. Long-haul WDM optical transmission systems for the high wavelength band using conventional erbium-doped active fibers require fiber lengths of a few hundred meters to reach a relative high gain. Presently, special erbium-doped active fibers having a larger core diameter are considered for use, which allow obtaining a relative high gain with fiber lengths down to 30–40 m.

The Applicant has recently found that, in the 1565–1620 nm band, transmission systems including erbium-ytterbium co-doped amplifiers provide very high performances, in particular they provide higher performances with respect to erbium-only doped optical amplifiers. In the european patent application No. EP98117898 filed on Sep. 22, 1998 in the name of the Applicant, it is proposed an optical amplifying unit including an erbium-ytterbium co-doped fiber amplifier in a single-stage configuration (with bi-directional pumping), or two erbium-ytterbium co-doped fiber amplifiers in a double-stage configuration (with co-propagating pumping or bi-directional pumping), providing high amplification in the 1575–1602 nm wavelength region. To reach very high power gains, the proposed amplifying unit preferably includes an erbium-doped fiber pre-amplifier and at least a double-cladding erbium-ytterbium co-doped fiber amplifier. Double-cladding active fibers allow high pump performances taking advantage of a multi-mode pumping mechanism. The used pump lasers are multi-mode broad-area lasers with an emission wavelength included in the wavelength range 920–980 nm, for example at 920 nm, each adapted to provide a pump power of approximately 400 mW to the active fibers.

In the design of the above described amplifying unit, the Applicant has found that the implementation of a WDM coupler adapted to couple the multimode pump radiation into the double-cladding fiber is critical. Coupling of the multimode pump radiation into the double-cladding fiber is performed preferably by means of micro optic (mirror-type) WDM couplers, which have coupling efficiencies much higher than those of fused fiber WDM couplers. The WDM coupler must be able to couple the pump radiation (in the range 920–980 nm) in the internal cladding of the fiber and the transmitted signal (in the range 1575–1602 nm) in the core. Thus, the coupler must

SUMMARY

According to the present invention, the Applicant has found an alternative amplifying unit arrangement adapted to be used in the 1565–1620 nm band and providing advantages over the known amplifying devices. The proposed amplifying unit is particularly suitable for use in a WDM transmission system, preferably as a booster amplifier.

The Applicant has found that, by pumping single-mode and single-cladding active fibre co-doped with Er and Yb by means of a first pump source adapted to excite Er by a first pump radiation and a second pump source adapted to excite Yb by a second pump radiation, a high performance and compact amplifying unit can be achieved.

Preferably, the first pump radiation includes a wavelength between 1465 nm and 1495 nm and is fed to the active fiber in a co-propagating direction (with respect to the transmitted signals) and the second pump radiation includes a wavelength between 1000 nm and 1100 nm and is fed to the active fiber-in a counter-propagating direction (with respect to the transmitted signals).

Preferably, the first pump source is coupled to the active fiber by means of a micro-optic WDM coupler and the second pump source is coupled to the active fiber by means of a fused-fiber WDM coupler.

The amplifying unit of the present invention extends the range of input signals to lower powers, with respect of typical booster units. This feature allows, for example, the design of a transmission system including a device with not negligible losses, for example OADMs (optical Add/drop Multiplexers, i.e. devices for the insertion and the extraction of optical signals to/from the system) or a dispersion compensator, just upstream with respect to the amplifying units. These additional losses can in fact be tolerated without sensible worsening of amplification.

An additional advantage is provided by the use of single-mode couplers to couple the pump radiation to the active fiber, which allows reduced signal losses.

Moreover, the amplifying unit of the present invention has a relatively wide wavelength amplification band extending above 1565 nm, and it is then particularly adapted for use in WDM transmission systems.

According to a first aspect, the present invention relates to an optical transmission system including:
an optical transmitting unit to transmit optical signals,
an optical receiving unit to receive said optical signals,
an optical fiber link optically coupling said transmitting unit to said receiving unit and adapted to convey said optical signals, and
an optical amplifying unit coupled along said link, adapted to amplify said optical signals; said optical amplifying unit comprising:
an input for the input of said optical signals,
an output for the output of said optical signals,
an active fiber codoped with Er and Yb, having a first end optically coupled to said input and a second end optically coupled to said output, for the amplification of said optical signals,
a first and a second pump source for generating a first and, respectively, a second pump radiation, and
a first and a second optical coupler for optically coupling said first pump source and, respectively, said second pump source to said active fibre,
wherein said first pump radiation includes an excitation wavelength for Er and said second pump radiation includes an excitation wavelength for Yb.

Said optical amplifying unit has preferably a wavelength amplification band above 1565 nm.

Advantageously, said first optical coupler is optically coupled to the first end of said active fiber for feeding the first pump radiation to the active fiber in a co-propagating direction with respect to optical signals and said second optical coupler is optically coupled to the second end of said active fiber for feeding the second pump radiation to the active fiber in a counter-propagating direction with respect to optical signals.

The active fiber is preferably a single-cladding fiber and is preferably a single-mode fiber.

The first pump radiation has preferably a wavelength between 1465 nm and 1495 nm and the second pump radiation has preferably a wavelength between 1000 nm and 1100 nm.

The first optical coupler is preferably a micro-optic WDM coupler and the second optical coupler is preferably a fused-fiber WDM coupler.

According to a second aspect, the present invention relates to a method for amplifying optical signals, including the steps of:
feeding the optical signals to an active fiber codoped with Er and Yb; and
optically pumping, during the step of feeding the optical signals, the active fiber;
wherein said step of optically pumping includes feeding to said active fiber a first pump radiation for exciting Er and a second pump radiation for exciting Yb.

Said step of feeding said first pump radiation preferably includes feeding said first pump radiation to the active fiber in a co-propagating direction with respect to optical signals and said step of feeding said second pump radiation preferably includes feeding said second pump radiation to the active fiber in a counter-propagating direction with respect to optical signals.

Said step of feeding to said active fiber a first pump radiation preferably includes feeding to said active fibre an exciting radiation for Er having a wavelength between 1465 nm and 1495 nm.

Said step of feeding to said active fiber a second pump radiation preferably includes feeding to said active fibre an exciting radiation for Yb having a wavelength between 1000 nm and 1100 nm.

Preferably, said active fiber includes a core and a cladding and in said step of feeding to said active fiber a first pump radiation and a second pump radiation includes feeding said first pump radiation and said second pump radiation into the core of said active fiber.

Preferably, said step of feeding the optical signals to the active fiber includes feeding to the active fiber optical signals having wavelengths above 1565 nm.

According to a third aspect, the present invention relates to an optical amplifying unit including:
  an input for the input of optical signals,
  an output for the output of said optical signals,
  an active fiber codoped with Er and Yb, optically connected to said input and said output, and adapted to amplify said optical signals,
  a first and a second pump source for generating a first and, respectively,
  a second pump radiation, and
  a first and a second optical coupler for optically coupling said first pump source and, respectively, said second pump source to said active fibre,
  wherein said first pump radiation includes an excitation wavelength for Er and said second pump radiation includes an excitation wavelength for Yb.

Preferably, the excitation wavelength for Er is between 1465 nm and 1495 nm and the excitation wavelength for Yb is between 1000 nm and 1100 nm.

Said first optical coupler is preferably connected between said input and said active fiber for feeding the first pump radiation to the active fiber in a co-propagating direction with respect to optical signals and said second optical coupler is preferably connected between said active fiber and said output for feeding the second pump radiation to the active fiber in a counter-propagating direction with respect to the optical signals.

Said active fiber is preferably a single-cladding and single-mode fiber.

Said first optical coupler is preferably a micro-optic WDM coupler and the second optical coupler is preferably a fused-fiber WDM coupler.

Preferably, said second pump source comprises a fiber laser including a further active fiber and adapted to generate said second pump radiation, and a pump laser source adapted to pump said further active fiber.

Said further active fiber preferably includes a double-cladding fiber. Moreover, said further active fiber preferably includes an optical fiber doped with Vb.

Said fiber laser preferably includes a first and a second Bragg grating written on opposite end portions of said further active fiber, said pump laser source is a broad-area laser diode.

The foregoing general description and the following detailed description are exemplary and explanatory only and are not restrictive of the invention as claimed. The following description, as well as the practice of the invention, set forth and suggest additional advantages an suggest additional advantages and purposes of this invention.

BRIEF DESCRIPTION OF THE DRAWINGS

The accompanying drawings, which are incorporated in and constitute a part of this specification, illustrate embodiments of the invention, and together with the description, explain the advantages and principles of the invention.

DETAILED DESCRIPTION

Figure 1:
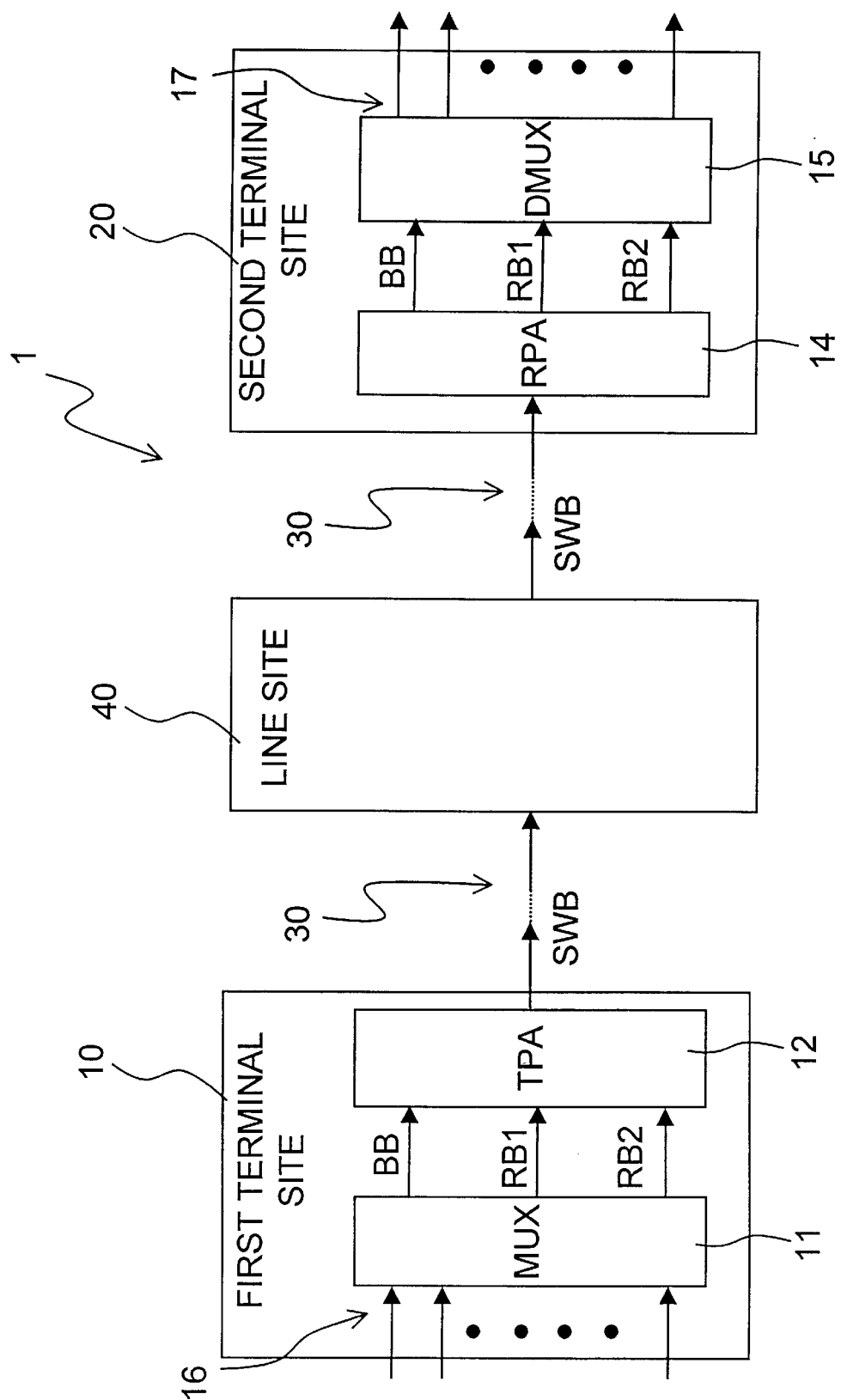
FIG. 1 is a block diagram of an optical transmission system consistent with the present invention.

Referring to FIG. 1, an optical transmission system 1 includes a first terminal site 10, a second terminal site 20, an optical fiber line 30 connecting the two terminal sites 10, 20, and at least one line site 40 interposed between the terminal sites 10 and 20 along the optical fiber line 30.

For simplicity, the optical transmission system 1 hereinafter described is unidirectional, that is signals travel from a terminal site to the other (in the present case from the first terminal site to the second terminal site), but any consideration that follow is to be considered valid also for bi-directional systems, in which signals travel in both directions. Further, although the optical transmission system 1 is adapted to transmit up to one-hundred-twenty-eight (128) channels, from the hereinafter description it will be obvious that the number of channels is not a limiting feature for the scope and the spirit of the invention, and less or more than one-hundred-twenty-eight (128) channels can be used depending on the needs and requirements of the particular optical transmission system.

The first terminal site 10 preferably includes a multiplexing section (MUX) 11 adapted to receive a plurality of input channels 16, and a transmitter power amplifier section (TPA) 12. The second terminal site 20 preferably includes a receiver pre-amplifier (RPA) section 14 and a demultiplexing section (DMUX) 15 adapted to output a plurality of output channels 17.

Multiplexing section 11, hereinafter described with reference to FIG. 3, multiplexes or groups input channels 16 preferably into three-sub-bands, referred to as blue-band BB, first red-band RB1 and second red-band RB2, although multiplexing section 11 could alternatively group input channels 16 into a number of sub-bands greater or less than three.

The three sub-bands BB, RB1 and RB2 are then received, as separate sub-bands or as a combined wide-band, in succession by TPA section 12, at least one line site 40 and second terminal site 20. Sections of optical fiber line 30 adjoin the at least one line site 40 with TPA section 12, RPA section 14, and possibly with others line sites 40 (not shown). TPA section 12, that will be later described with reference to FIG. 4, receives the separate sub-bands BB, RB1 and RB2 from multiplexing section 11, amplifies and optimizes them, and then combines them into a single wide-band SWB for transmission on a first section of optical fiber line 30. Line site 40, that will be later described with reference to FIG. 6, receives the single wide-band SWB, re-divides the single wide-band SWB into the three sub-bands BB, RB1 and RB2, eventually adds and drops signals in each sub-band BB, RB1 and RB2, amplifies and optimizes the three sub-bands BB, RB1 and RB2 and then recombines them into the single wide-band SWB. For the adding and dropping operations, line site 40 may be provided with Optical Add/Drop Multiplexers (OADM) of a known type or, for example, of the type described in EP patent application Ser. No. 98110594.3 in the name of the Applicant.

A second section of optical fiber line 30 couples the output of the line site 40 to either another line site 40 (not shown) or to RPA section 14 of second terminal site 20. RPA section 14, that will be later described with reference to FIG. 7, also amplifies and optimizes the single wide-band SWB and may split the single wide-band SWB into the three sub-bands BB, RB1 and RB2 before outputting them.

Figure 8:
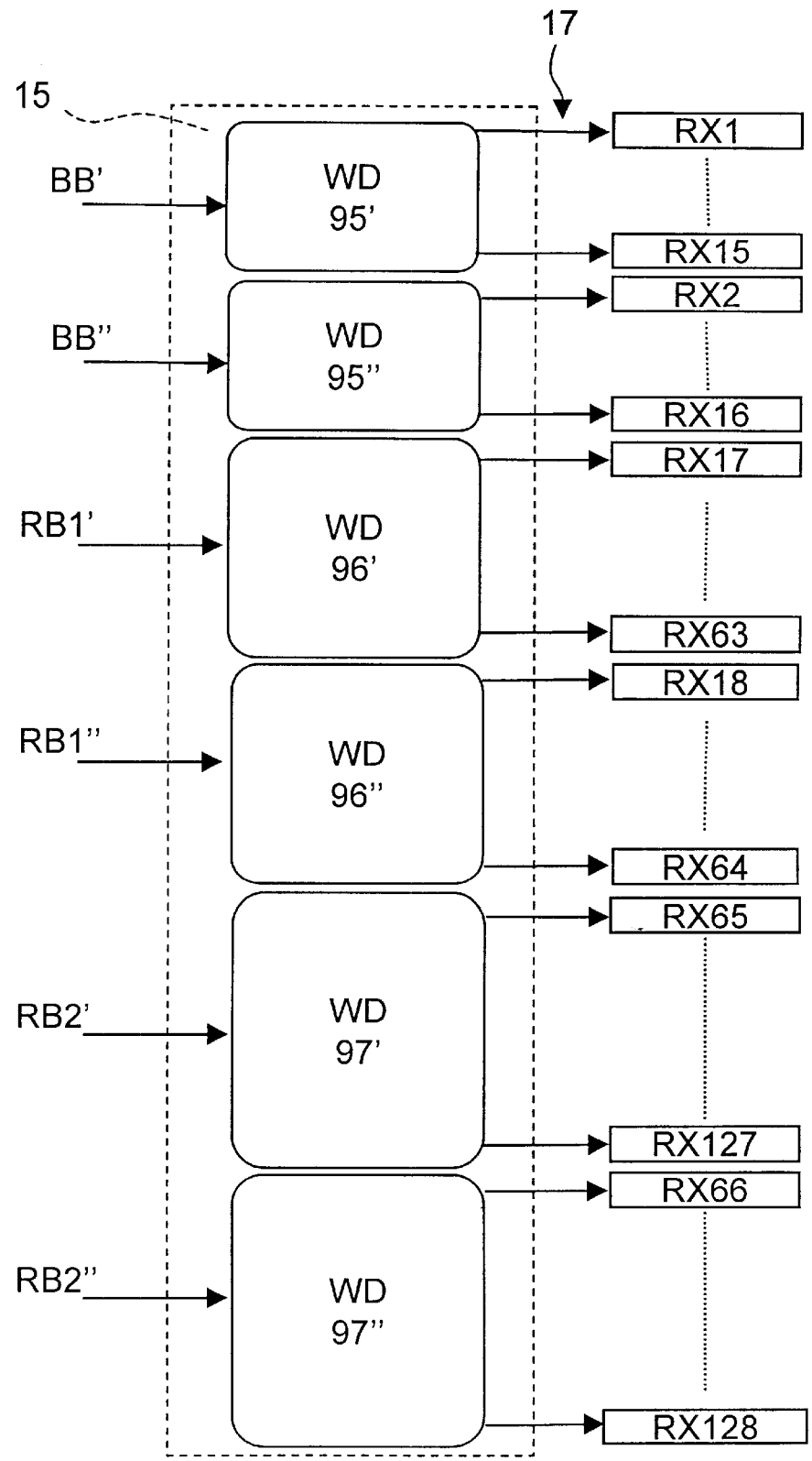
FIG. 8 is a detailed diagram of a multiplexing section of the optical transmission system of FIG. 1.

Demultiplexing section 15, that will be later described with reference to FIG. 8, receives the three sub-bands BB, RB1 and RB2 from RPA section 14 and splits the three sub-bands BB, RB1 and RB2 into the individual wavelengths of output channels 17. The number of input channels 16 and output channels 17 may be unequal, owing to the fact that some channels can be dropped and/or added in line site (or line sites) 40.

According to the above, for each sub-band BB, RB1 and RB2 an optical link is defined between the corresponding input of TPA section 12 and the corresponding output of RPA section 14.

Figure 2:
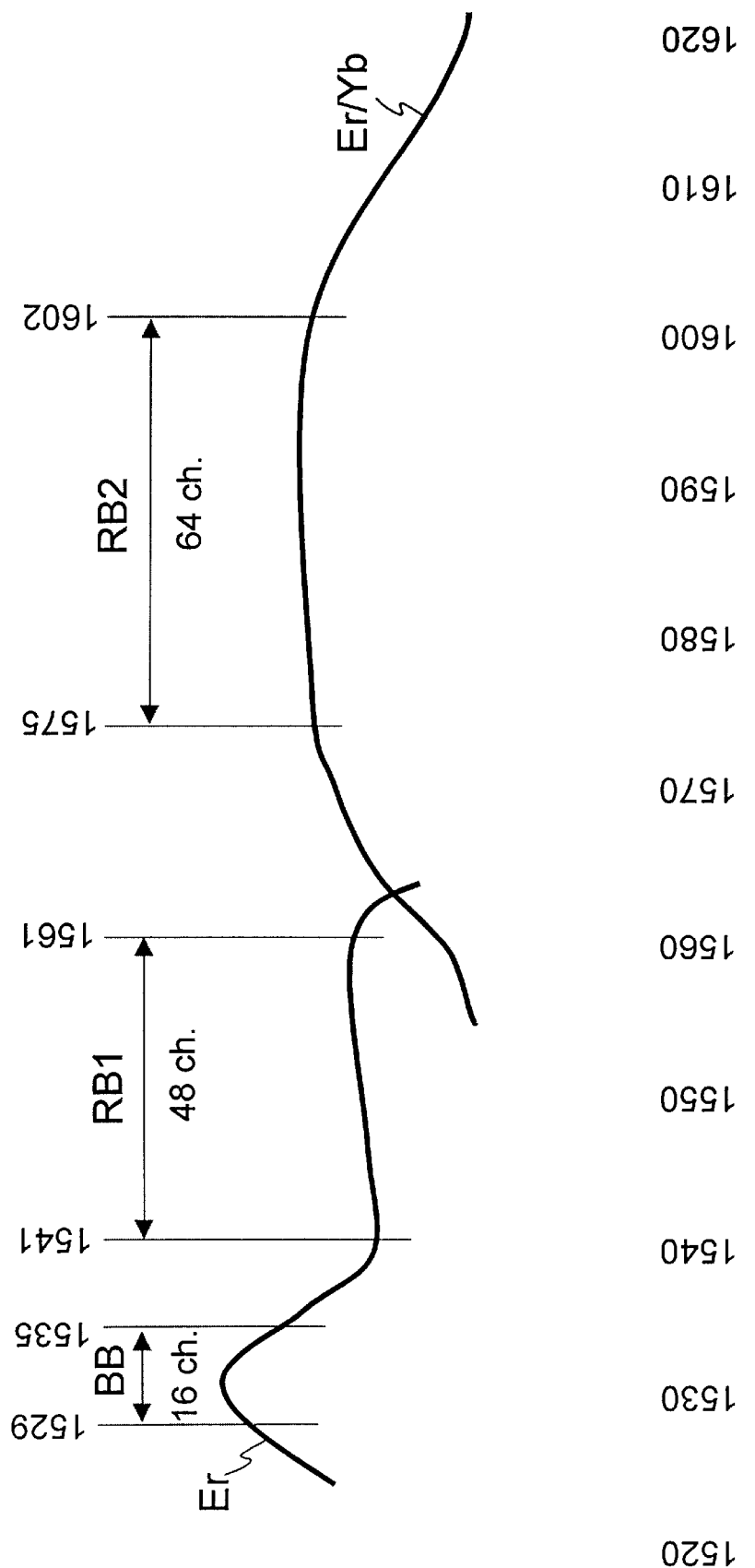
FIG. 2 is a qualitative graph of the spectral gain characteristic of the optical transmission system of FIG. 1, with a designation of the signal transmission bands (BB, RB1 and RB2)

FIG. 2 is a qualitative graph of the spectral emission ranges of the amplifiers used in the optical transmission system 1 and approximately corresponding to the different gain for channels of signals traveling through the fiber link and the different allocation of the three sub-bands BB, RB1 and RB2. In particular, the first sub-band BB preferably covers the range between 1529 nm and 1535 nm, corresponds to a first amplification wavelength range of erbium-doped fiber amplifiers and allocates up to sixteen (16) channels; the second sub-band RB1 falls between 1541 nm and 1561 nm, corresponds to a second amplification wavelength range of erbium-doped fiber amplifiers and allocates up to forty-eight (48) channels; and the third sub-band RB2 covers the range between 1575 nm and 1602 nm, corresponds, according to the invention, to an amplification wavelength range of erbium/ytterbium-doped fiber amplifiers and allocates up to sixty-four (64) channels. The gain spectral graph of the erbium/ytterbium-doped fiber amplifiers is such that, although the 1575–1602 nm range offers the best performances in terms of amplification, channels can be advantageously allocated down to 1565 nm and up to 1620 nm.

Adjacent channels, in the proposed one-hundred-twenty-eight (128) channel system, have preferably a 50 GHz constant spacing. Alternatively, a different constant spacing may be used, or the frequency spacing may be unequal to alleviate the known four-wave-mixing phenomenon.

In the erbium amplification band, the RB1 and RB2 bands have a fairly flat gain characteristic, while the BB band includes a substantial hump in the gain response. As explained below, to make use of the erbium-doped fiber spectral emission range in the BB band, optical transmission system 1 uses equalizing means to flatten the gain characteristic in that range. As a result, by dividing the erbium-doped fiber spectral emission range of 1529–1602 nm into three sub-ranges that respectively include the BB band, RB1 band and RB2 band, optical transmission system 1 can effectively use most of the erbium-doped fiber spectral emission range and provide for dense WDM.

The following provides a more detailed description of the various modules of the present invention depicted in FIG. 1.

Figure 3:
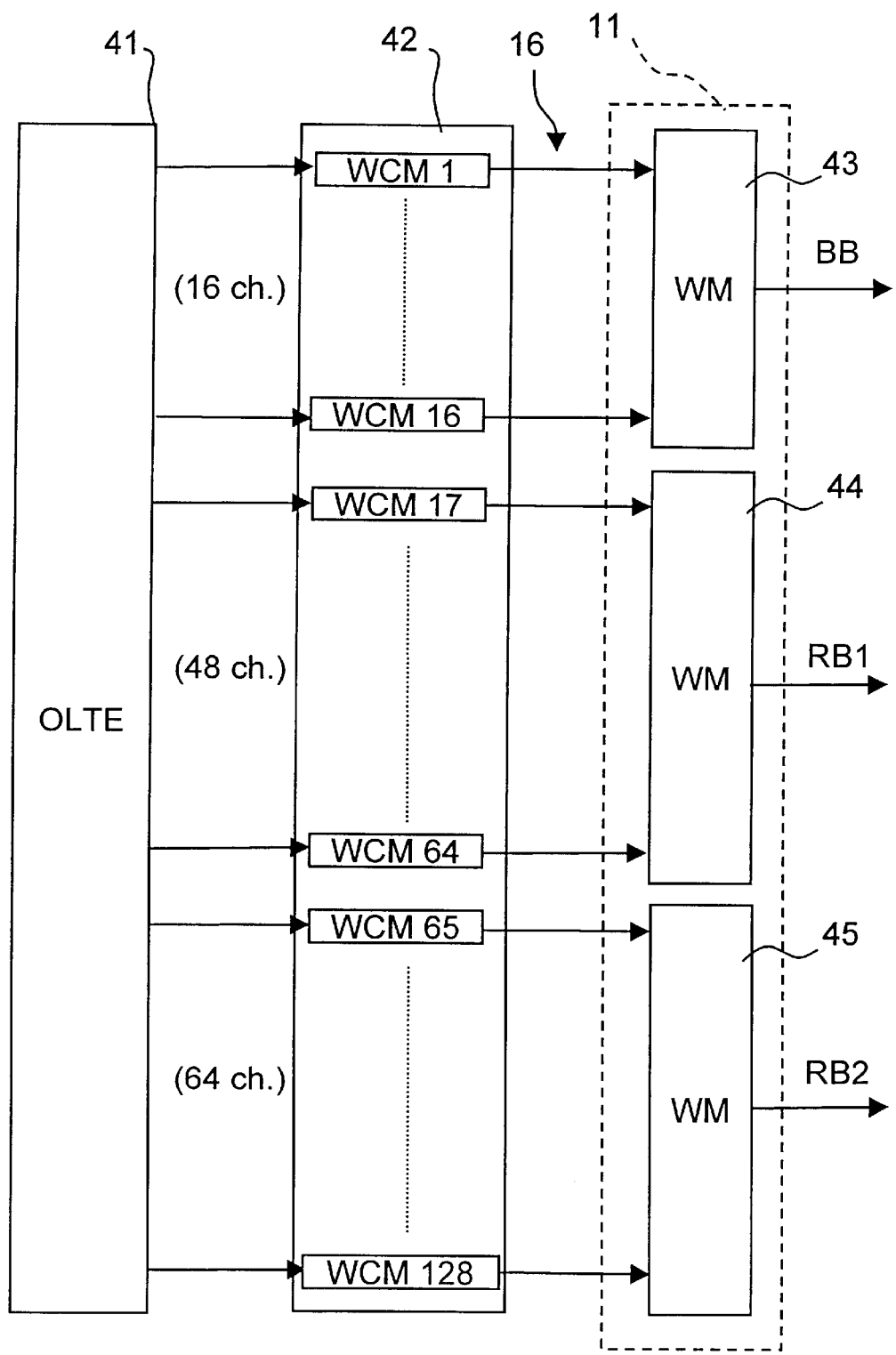
FIG. 3 is a more detailed diagram of the multiplexing section of the optical transmission system in FIG. 1.

FIG. 3 shows a more detailed diagram of the first terminal site 10. The first terminal site 10 includes, in addition to the multiplexing section 11 and the TPA section 12 (not shown in FIG. 3), an optical line terminal section (OLTE) 41 and a wavelength converter section (WCS) 42.

OLTE 41, which may correspond to standard line terminating equipment for use in a standard system, e.g. a SONET, ATM, IP or SDH system, includes transmit/receive (TX/RX) units (not shown) in a quantity that equals the number of channels in WDM systems 10. In a preferred embodiment, OLTE 41 has one-hundred-twenty-eight (128) TX/RX units. In multiplexing section 11, OLTE 41 transmits a plurality of signals at a generic wavelength. As shown in FIG. 3, in a preferred embodiment OLTE 41 outputs a first group of sixteen (16) channels, a second group of forty-eight (48) channels and a third group of sixty-four (64) channels. However, as indicated above, the number of channels may vary depending on the needs and requirements of the particular optical transmission system.

As readily understood to one of ordinary skill in the art, OLTE 41 may comprise a collection of smaller separate OLTEs, such as three, that feed information frequencies to WCS 42. Accordingly, WCS 42 includes one-hundred-twenty-eight (128) wavelength converter modules WCM1–WCM128.

Units WCM1–WCM16 each receive a respective one of the first group of signals emitted from OLTE 41, units WCM17–WCM64 each receive one of the second group of signals emitted from OLTE 41 and units WCM65–WCM128 each receive one of the third group of signals emitted from OLTE 41. Each unit is able to convert a signal from a generic wavelength to a selected wavelength and re-transmit the signal. The units may receive and re-transmit a signal in a standard format, such as OC-48 or STM-16, but the preferred operation of WCM1–128 is transparent to the particular data format employed.

Each WCM1–128 preferably comprises a module having a photodiode (not shown) for receiving an optical signal from OLTE 41 and converting it to an electrical signal, a laser or optical source (not shown) for generating a fixed carrier wavelength, and an electro-optic modulator such as a Mach-Zehnder modulator (not shown) for externally modulating the fixed carrier wavelength with the electrical signal. Alternatively, each WCM1–128 may comprise a photodiode (not shown) together with a laser diode (not shown) that is directly modulated with the electrical signal to convert the received wavelength to the carrier wavelength of the laser diode. As a further alternative, each WCM1–128 comprises a module having a high sensitivity receiver (e.g., according to SDH or SONET standards) for receiving an optical signal, e.g., via a wavelength demultiplexer, from a trunk fiber line end and converting it to an electrical signal, and a direct modulation or external modulation laser source. By the latter alternative, regeneration of signals from the output of a trunk fiber line and transmission in the inventive optical communication system is made possible, which allows extending the total link length.

Although FIG. 3 shows that the signals are provided and generated by the combination of OLTE 41 and WCM1–WCM128, the signals can also be directly provided and generated by a source without limitation to their origin.

The multiplexing section 11 includes three wavelength multiplexers (WM) 43, 44 and 45. For the preferred one-hundred-twenty-eight (128) channels system, each selected wavelength signal output from units WCM1–WCM16 is received by WM 43, each selected wavelength signal output from WCM17–WCM64 is received by WM 44 and each selected wavelength signal output from WCM65–WCM128 is received by WM 45. WM 43, WM 44 and WM 45 combine the received signals of the three bands BB, RB1 and RB2 into three respective wavelength division multiplexed signals. As shown in FIG. 3, WM 43 is a sixteen (16) channels wavelength multiplexer, such as a conventional 1×16 planar optical splitter, WM 44 is a forty-eight (48) channels wavelength multiplexer, such as a conventional 1×64 planar optical splitter with sixteen (16) unused ports and WM 45 is a sixty-four (64) channels wavelength multiplexer, such as a conventional 1×64 planar optical splitter. Each wavelength multiplexer may include a second port (e.g. 2×16 and 2×64 splitters) for providing optical transmission system 1 with an optical monitoring channel (not shown). As well, WM 43, 44 and 45 may have more inputs than is used by the system to provide space for system growth. A wavelength multiplexer using passive silica-on-silicon ($SiO_2$—Si) or silica-on-silica ($SiO_2$—$SiO_2$) technology, for instance, can be made by one of ordinary skill in the art. Other technologies can also be used for WMs, e.g., for reducing insertion losses. Examples are AWG (Arrayed Waveguide Gratings), cascaded Mach-Zehnder, fiber gratings, and interferential filters.

Figure 4:
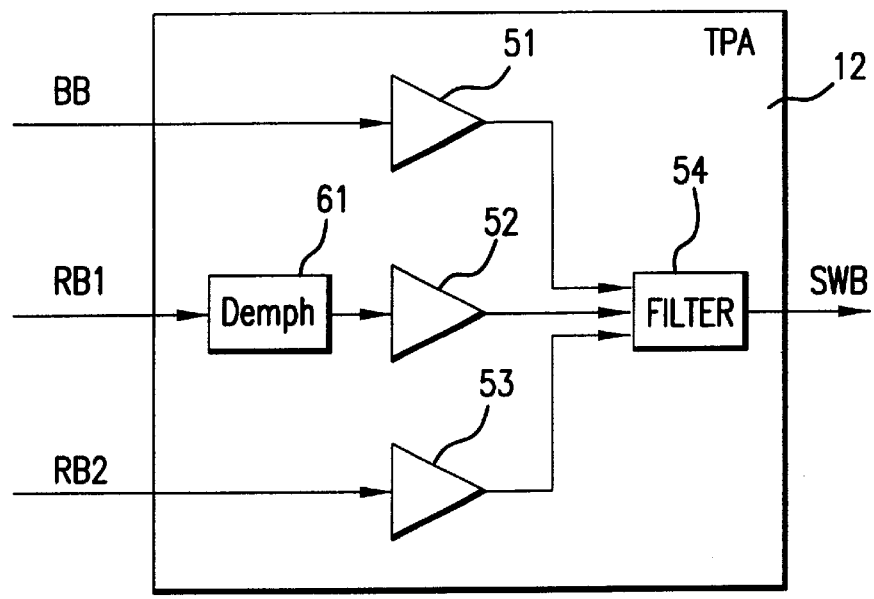
FIG. 4 is a more detailed diagram of the transmitter power amplifier section of the optical transmission system in FIG. 1.

With reference to FIG. 4, the BB, RB1 and RB2 band output from multiplexing section 11 are received by TPA section 12. The BB, RB1 and RB2 band signals may be provided to TPA section 12 from a source other than the OLTE 41, WCS 42, and WM 43, 44 and 45 configuration depicted in FIG. 3. For example, the BB, RB1 and RB2 band signals may be generated and directly supplied to TPA section 12 by a customer without departing from the intent of the present invention described in more detail below.

TPA section 12 includes three amplifier sections 51, 52, 53, each for a respective band BB, RB1 and RB2, a coupling filter 54 and an equalizing filter 61. Amplifier sections 51, 52 are preferably erbium-doped two-stages fiber amplifiers (although other rare-earth-doped fiber amplifiers may be used), while amplifier section 53 is, according to the invention, an erbium/ytterbium-doped (Er/Yb) fiber amplifier that will be described in details with reference to FIG. 9.

The outputs of amplifiers 51, 52 and 53 are received by filter 54, which combines the BB, RB1 and RB2 bands into a single wide-band (SWB).

Each of the amplifiers 51 and 52 is pumped by one or two laser diodes to provide optical gain to the signals it amplifies. The characteristics of each amplifier, including its length and pump wavelength, are selected to optimize the performance of that amplifier for the particular sub-band that it amplifies. For example, the first stage (pre-amplifier) of amplifier sections 51 and 52 may be pumped with a laser diode (not shown) operating at 980 nm to amplify the BB band and the RB1 band, respectively, in a linear or in a saturated regime. Appropriate laser diodes are available from the Applicant. The laser diodes may be coupled to the optical path of the pre-amplifiers using 980/1550 WDM couplers (not shown) commonly available on the market, for example model SWDM0915SPR from E-TEK DYNAMICS, INC., 1885 Lundy Ave., San Jose, Calif. (USA). The 980 nm laser diode provides a low noise figure for the amplifiers compared with other possible pump wavelengths.

The second stage of each amplifier section 51–53 preferably operates in a saturated condition. The second stage of amplifier section 51 is preferably erbium-doped and amplifies the BB band with another 980 nm pump (not shown) coupled to the optical path of the BB band using a WDM coupler (not shown) described above. The 980 nm pump provides better gain behavior and noise figure for signals in the low band region that covers 1529–35 nm. The second stage of amplifier section 52 is preferably erbium-doped and amplifies the RB1 band with a laser diode pump source operating at 1480 nm. Such a laser diode is available on the market, such as model FOL1402PAX-1 supplied by JDS FITEL, INC., 570 Heston Drive, Nepean, Ontario (Calif.). The 1480 nm pump provides better saturated conversion efficiency behavior, which is exploited in the RB1 band for the greater number of channels in the region that covers 1542–61 nm. Alternatively, a higher power 980 nm pump laser or multiplexed pump sources in the 980 nm wavelength region may be used. Section 53 will be hereunder described in details with reference to FIG. 9.

Figure 5:
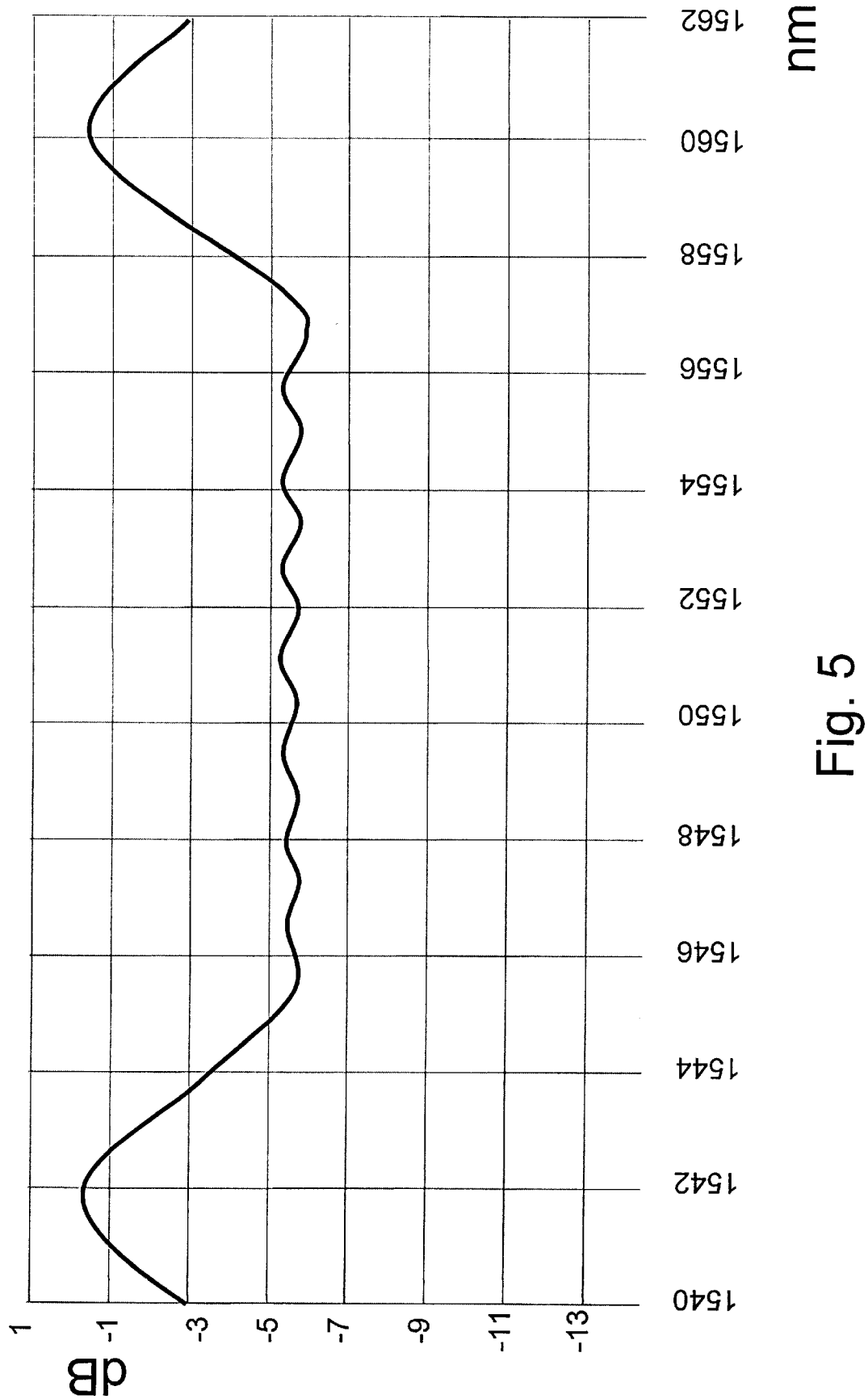
FIG. 5 is a graph of a filter performance shape of a de-emphasis filter for the optical transmission system of FIG. 1.

Filter 61 is positioned within the RB1 band amplifier chain for helping to equalize signal levels and SNRs at the system output across the RB1 band. In particular, filter 61 comprises a de-emphasis filter that attenuates the wavelength regions of the high amplification within the RB1 band. The de-emphasis filter, if used, may employ long period Bragg grating technology, split-beam Fourier filter, etc. As an example, the de-emphasis filter may have an operating wavelength range of 1541–1561 nm and have wavelengths of peak transmission at 1541–1542 nm and 1559–1560 nm, with a lower, relatively constant transmission for the wavelengths between these peaks. FIG. 5 illustrates the filter shape or relative attenuation performance of a preferred de-emphasis filter 61. The graph of FIG. 5 shows that the de-emphasis filter 61 has regions of peak transmission at around 1542 nm and 1560 nm, and a region of relatively constant or flat attenuation between about 1546 nm and 1556 nm. The de-emphasis filter 61 for erbium-doped fiber amplifiers need only add an attenuation of about 3–4 dB at wavelengths between the peaks to help flatten the gain response across the high band. The de-emphasis filter 61 may have an attenuation characteristic different from that depicted in FIG. 5 depending on the gain-flattening requirements of the actual system employed, such as the dopant used in the fiber amplifiers or the wavelength of the pump source for those amplifiers.

Alternatively, the de-emphasis filter 61 may be omitted and the de-emphasis operation may be obtained in the multiplexing section 11 of the first terminal site 10 by means of calibrated attenuation.

After passing through the amplifiers of TPA 12, the amplified BB, RB1 and RB2 bands output from amplifier sections 51, 52 and 53, respectively, are received by filter 54. Filter 54 is a band combining filter and may, for example, include two cascaded interferential three port filter (not shown), the first coupling the BB band with the RB1 band and the second coupling the BB/RB1 bands provided by the first filter with the RB2 band.

An optical monitor (not shown) and insertion for a service line, at a wavelength different from the communication channels, e.g. at 1480 nm, through a WDM 1480/1550 interferential filter (not shown) may also be added at the common port. The optical monitor detects optical signals to ensure that there is no break in optical transmission system 1. The service line insertion provides access for a line service module, which can manage through an optical supervisory channel the telemetry of alarms, surveillance, monitoring of performance and data, controls and housekeeping alarms, and voice frequency orderwire.

Figure 6:
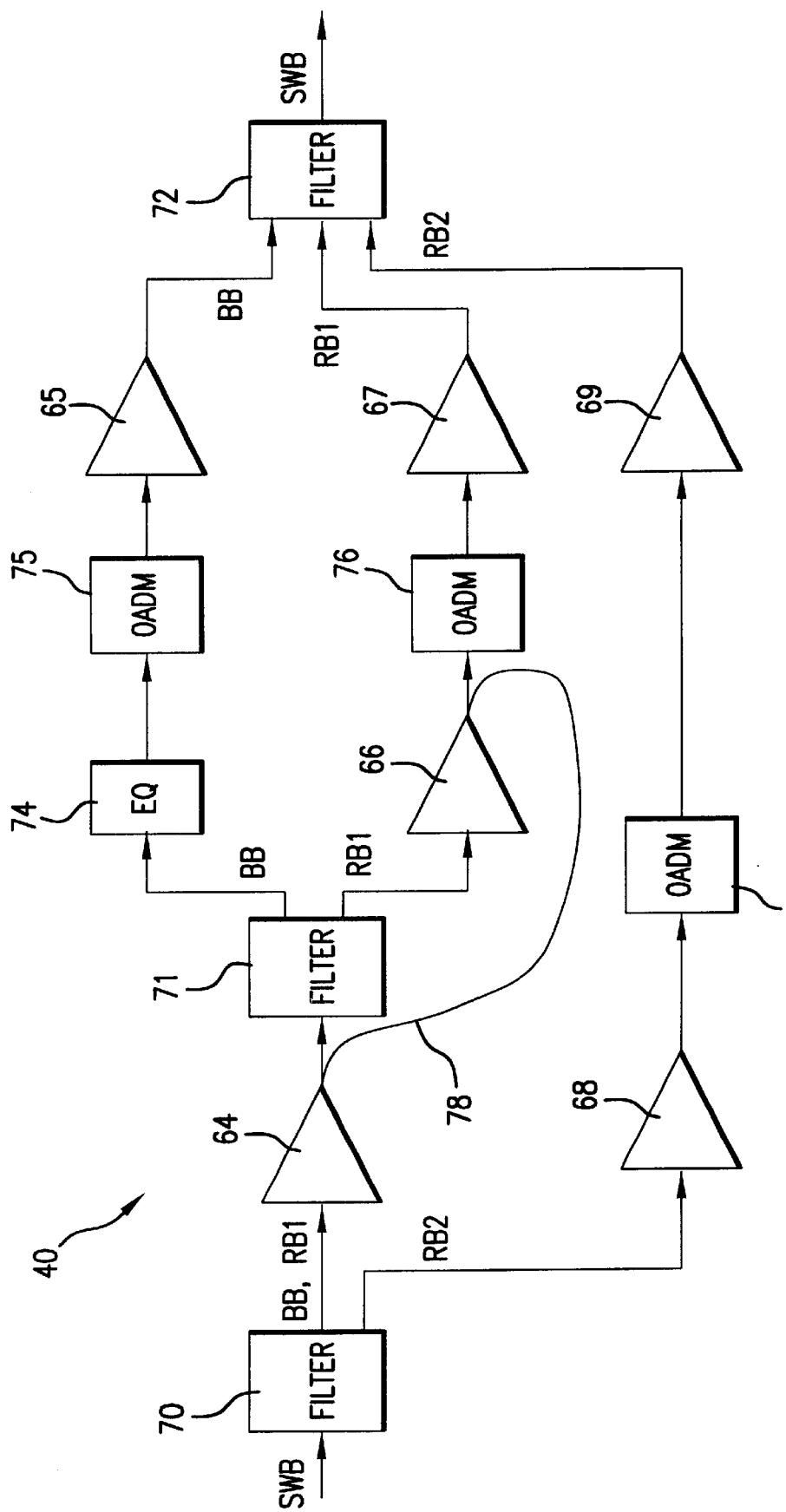
FIG. 6 is a detailed diagram of an intermediate station of the optical transmission system of FIG. 1.

The single wide-band output from filter 54 of TPA section 12 passes through a length of transmission fiber (not shown) of optical fiber line 30 such as 100 kilometers, which attenuates the signals within the single wide-band SWB. Consequently, line site 40 receives and amplifies the signals within the single wide-band SWB. As shown in FIG. 6, line site 40 includes several amplifiers (AMP) 64–69, three filters 70–72, an equalizing filter (EQ) 74 and three OADM stages 75–77.

Filter 70 receives the single wide-band. SWB and separates the RB2 band from the BB and the RB1 bands. Amplifier 64 receives and amplifies the BB and the RB1 bands, whereas filter 71 receives the output from amplifier 64 and separates the BB band and the RB1 band. The BB band is equalized by equalizing filter 74, received by the first OADM stage 75 where predetermined signals are dropped and/or added, and further amplified by amplifier 65. The RB1 band, which has already passed through de-emphasis filter 61 in TPA 12, is first amplified by amplifiers 66, then received by the second OADM stage 76 where predetermined signals are dropped and/or added, and further amplified by amplifier 67. The RB2 band is first amplified by amplifier 68, then received by the third OADM stage 77 where predetermined signals are dropped and/or added, and further amplified by amplifier 69. The amplified BB, RB1 and RB2 bands are then recombined into the single wide-band SWB by filter 72.

Amplifier 64, which receives the single wide-band SWB, preferably comprises a single optical fiber amplifier that is operated in a linear regime. That is, amplifier 64 is operated in a condition where its output power is dependent on its input power. Depending on the actual implementation, amplifier 64 may alternatively be a single-stage or a multi-stage amplifier. By operating it in a linear condition, amplifier 64 helps to ensure relative power independence between the BB and RB1 band channels. In other words, with amplifier 64 operating in a linear condition, the output power (and signal-to-noise ratio) of individual channels in the one of the two sub-bands BB, RB1 does not vary significantly if channels in the other sub-band RB1, BB are added or removed. To obtain robustness with respect to the presence of some or all of the channels in a dense WDM system, first stage amplifier (such as amplifier 64 and amplifier 68) must be operated, in a line site 40, in an unsaturated regime, before extracting a portion of the channels for separate equalization and amplification. In a preferred embodiment, amplifiers 64 and 68 are erbium-doped fiber amplifiers, pumped in a co-propagating direction with a laser diode (not shown) operating at 980 nm pump to obtain a noise figure preferably less than 5.5 dB for each band.

Filter 71 may comprise, for example, a three-port device, preferably an interferential filter, having a drop port that feeds the BB band into equalizing filter 74 and a reflection port that feeds the RB1 band into amplifier 66.

Amplifier 66 is preferably a single erbium-doped fiber amplifier that is operated in saturation, such that its output power is substantially independent from its input power. In this way, amplifier 66 serves to add a power boost to the channels in the RB1 band compared with the channels in the BB band. Due to the greater number of channels in the RB1 band compared with the BB band in the preferred embodiment, i.e. forty-eight (48) channels as opposed to sixteen (16), the RB1 band channels typically will have had a lower gain when passing through amplifier 64. As a result, amplifier 66 helps to balance the power for the channels in the RB1 band compared with the BB band. Of course, for other arrangements of channels between the BB and the RB1 bands, amplifier 66 may not be required or may alternatively be required on the BB band side of line site 40.

With respect to the RB1 band of channels, amplifiers 64 and 66 may be viewed together as a two-stage amplifier with the first stage operated in a linear mode and the second stage operated in saturation. To help stabilize the output power between channels in the RB1 band, amplifier 64 and 66 are preferably pumped with the same laser diode pump source. In this manner, as described in EP 695049, the residual pump power from amplifier 64 is provided to amplifier 66. Specifically, line site 40 includes a WDM coupler positioned between amplifier 64 and filter 71 that extracts 980 nm pump light that remains at the output of amplifier 64. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler of the same type and positioned in the optical path after amplifier 66. The two couplers are joined by an optical fiber 78 that transmits the residual 980 nm pump signal with relatively low loss. The second WDM coupler passes the residual 980 nm pump power into amplifier 66 in a counter-propagating direction.

From amplifier 66, RB1 band signals are conveyed to OADM stage 76 of a known type or of the type described in EP patent application Ser. No. 98110594.3 in the name of the Applicant. From OADM stage 76, RB1 band signals are fed to amplifier 67. For the preferred erbium-doped fiber amplifier, amplifier 67 has a pump wavelength of, for example, 1480 nm from a laser diode source (not shown) having a pump power in excess of the laser (not shown) that drives amplifiers 64 and 66. The 1480 nm wavelength provides good conversion efficiency for high output power output compared with other pump wavelengths for erbium-doped fibers. Alternatively, a high power 980 nm pump source or a group of multiplexed pump sources, such as one at 975 nm and another at 986 nm, or two polarization multiplexed pump sources at 980 nm, could be used to drive amplifier 67. Amplifier 67 preferably operates in saturation to provide the power boost to the signals within the RB1 band, and if desired, may comprise a multi-stage amplifier.

After passing through amplifier 64 and filter 71, the BB band enters equalizing filter 74. As discussed above, the gain characteristic for the erbium-doped fiber spectral emission range has a peak or hump in the BB band region, but remains fairly flat in the RB1 band region. As a result, when the BB band or the single wide-band SWB (which includes the BB band) is amplified by an erbium-doped fiber amplifier, the channels in the BB band region are amplified unequally. Also, as discussed above, when equalizing means have been applied to overcome this problem of unequal amplification, the equalizing has been applied across the entire spectrum of channels, resulting in continued gain disparities. However, by splitting the spectrum of channels into a BB band and a RB1 band, equalization in the reduced operating area of the BB band can provide proper flattening of the gain characteristic for the channels of the BB band.

In a preferred embodiment, the equalizing filter 74 comprises a two-port device based on long period chirped Bragg grating technology that gives selected attenuation at different wavelengths. For instance, equalizing filter 74 for the BB band may have an operating wavelength range of 1529 nm to 1536 nm, with a wavelength at the bottom of the valley at between 1530.3 nm and 1530.7 nm. Equalizing filter 74 need not be used alone and may be combined in cascade with other filters (not shown) to provide an optimal filter shape, and thus, gain equalization for the particular amplifiers used in the WDM system 1. Equalizing filter 74 may be manufactured by one skilled in the art, or may be obtained from numerous suppliers in the field. It is to be understood that the particular structure used for the equalizing filter 74 is within the realm of the skilled artisan and may include, for instance, a specialized Bragg grating like a long period grating, an interferential filter, or Mach-Zehnder type optical filters.

From equalizing filter 74, BB band signals are conveyed to OADM stage 75, which is, for example, of the same type of OADM stage 76, and then to amplifier 65. With the preferred erbium-doped fiber amplifier, amplifier 65 has a pump wavelength of 980 nm, provided by a laser diode source (not shown) and coupled via a WDM coupler (not shown) to the optical path for pumping the amplifier 65 in a counter-propagating direction. Since the channels in the BB band pass through both amplifier 64 and amplifier 65, equalizing filter 74 may compensate for the gain disparities caused by both amplifiers. Thus, the decibel drop for equalizing filter 74 should be determined according to the overall amplification and line power requirements for the BB band. The amplifier 65 preferably operates in saturation to provide a power boost to the signals in the BB band, and may comprise a multi-stage amplifier if desired.

The RB2 band is received from fiber amplifier 68, which is, preferably, an erbium doped fiber amplifier pumped with a 980 nm or a 1480 nm pump light, depending on the system requirements. From amplifier 68, RB2 band channels are conveyed to OADM stage 77, which is, for example, of the same type of OADM stages 75 and 76, and then fed to amplifier 69. Amplifier 69 is, according to the invention, an erbium/ytterbium co-doped amplifier adapted to amplify the RB2 band and will be described in details with reference to FIG. 10.

After passing through amplifiers 65, 67 and 69 respectively, the amplified BB, RB1 and RB2 bands are then recombined by filter 72 into the single wide-band SWB. Like filter 54 of FIG. 4, filter 72 may, for example, include two cascaded interferential three port filter (not shown), the first coupling the BB with the RB1 bands and the second coupling the BB and RB1 bands provided by the first filter with the RB2 band.

Like TPA section 12, line site 40 may also include an optical monitor and a service line insertion and extraction (not shown) through, e.g., a WDM 1480/1550 interferential filter (not shown). One or more of these elements may be included at any of the interconnection points of line site 40.

Besides amplifiers 64–69, filters 70–72 and 74, and OADM stages 75–77, line site 40 may also include a dispersion compensating module (DCM) (not shown) for compensating for chromatic dispersion that may arise during transmission of the signals along the long-distance communication link. The DCM (not shown) is preferably comprised of subunits coupled upstream one or more of amplifiers 65, 67, 69 for compensating the dispersion of channels in one or more than one of the BB, RB1, RB2 bands, and may also have several forms. For example, the DCM may have an optical circulator with a first port connected to receive the channels in the three bands BB, RB1 and RB2. A chirped Bragg grating may be attached to a second port of the circulator. The channels will exit the second port and be reflected in the chirped Bragg grating to compensate for chromatic dispersion. The dispersion compensated signals will then exit a next port of the circulator for continued transmission in the WDM system. Other devices besides the chirped Bragg grating, such as a length of dispersion compensating fiber, may be used for compensating the chromatic dispersion. The design and use of the DCM section are not limiting the present invention and the DCM section may be employed or omitted in the WDM system 1 depending on overall requirements for system implementation.

After the line site 40, the combined single wide-band SWB signal passes through a length of long-distance optical transmission fiber of optical fiber line 30. If the distance between the first and the second terminal site 10, 20 is sufficiently long to cause attenuation of the optical signals, i.e. 100 kilometers or more, one or more additional line sites 40 providing amplification may be used. In a practical arrangement, five spans of long-distance transmission fiber are used (each having a power loss of 0.22 dB/km and a length such as to provide a total span loss of approximately 25 dB), separated by four amplifying line site 40.

Figure 7:
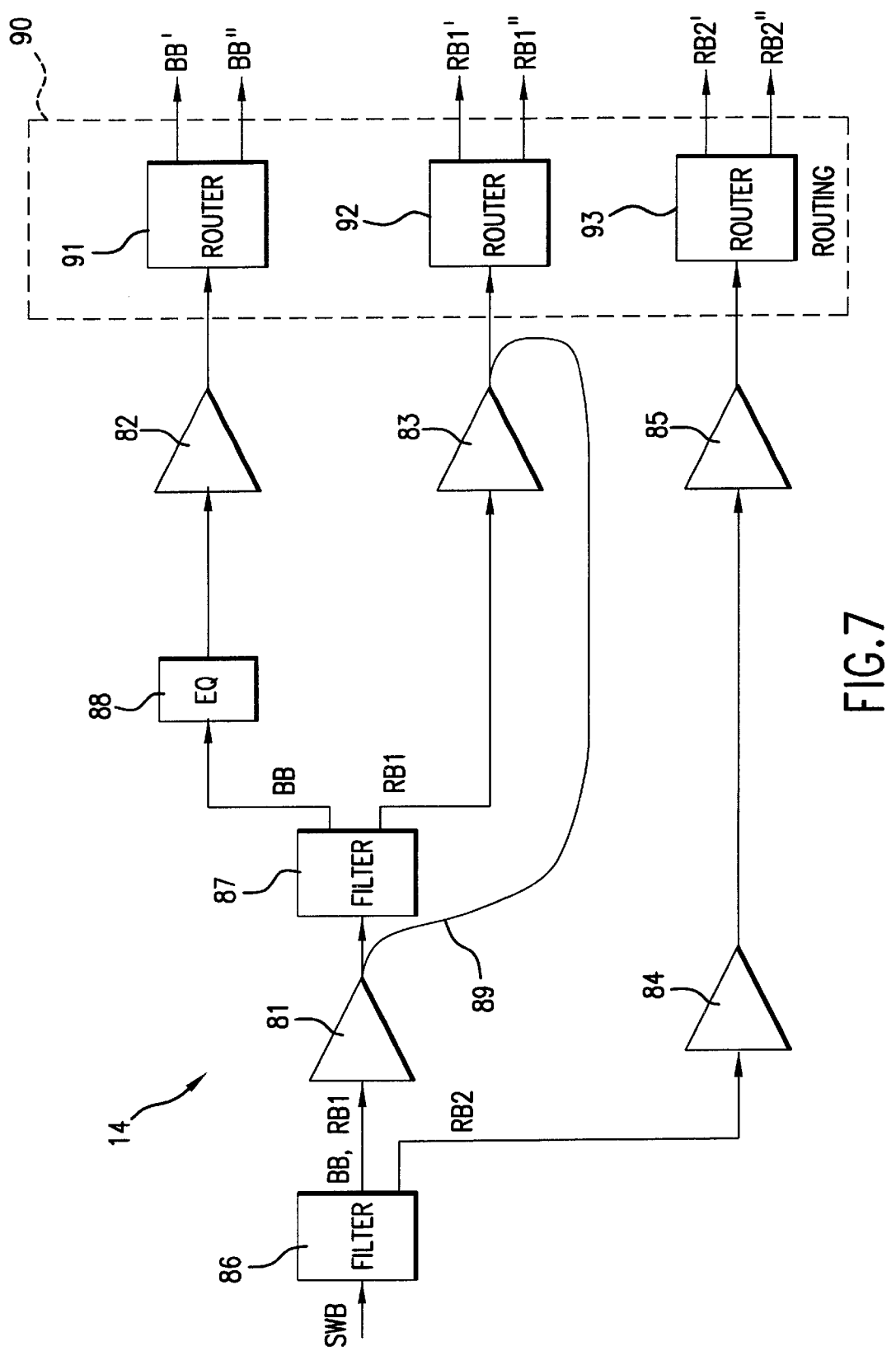
FIG. 7 is a detailed diagram of a receiver pre-amplifier section of the optical transmission system of FIG. 1.

Following the final span of transmission fiber, RPA section 14 receives the single wide-band SWB from last line site 40 and prepares the signals of the single wide-band SWB for reception and detection at the end of the communication link. As shown in FIG. 7, RPA section 14 may include amplifiers (AMP) 81–85, filters 86 and 87, an equalizing filter 88 and, if necessary, three router modules 91–93.

Filter 86 receives the single wide-band SWB and separates the RB2 band from the BB and RB1 bands. Amplifier 81 is preferably doped with erbium and amplifies the BB and RB1 bands to help improve the signal-to-noise ratio for the channels in the BB and RB1 bands. Amplifier 81 is pumped, for example, with a 980 nm pump or with a pump at some other wavelength to provide a low noise figure for the amplifier. The BB and RB1 bands are in turn separated by filter 87.

As with TPA section 12 and line site 40, amplifier 82 and 83 amplify the BB band and, respectively, the RB1 band, with a 980 nm pumping. To help stabilize the output power between channels in the RB1 band, amplifier 81 and 83 are preferably pumped with the same 980 nm laser diode pump source, by using a joining optical fiber 89 that transmits the residual 980 nm pump signal with relatively low loss. Specifically, amplifier 81 is associated with a WDM coupler, positioned between amplifier 81 and filter 87, that extracts the 980 nm pump light that remains at the output of amplifier 81. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler of the same type and positioned in the optical path after amplifier 83. The two couplers are joined by an optical fiber 89 that transmits the residual 980 nm pump signal with relatively low loss. The second WDM coupler passes the residual 980 nm pump power into amplifier 83 in a counter-propagating direction. Thus, amplifiers 81–83, filter 87 and equalizing filter 88 perform the same functions as amplifiers 64, 65 and 67, filter 71, and equalizing filter 74, respectively, of line site 40 and may comprise the same or equivalent parts depending on overall system requirements.

Amplifier 84 is coupled to filter 86 to receive and amplify the RB2 band. Amplifier 84 is, for example, an erbium-doped amplifier identical to the amplifier 68 of FIG. 6. RB2 band channels are then received by amplifier 85 that is, preferably, an erbium-doped amplifier of a known type.

RPA section 14 further comprises a routing stage 90, which permits to adapt the channel spacing within the BB, RB1 and RB2 bands to the channel separation capability of demultiplexing section 15. In particular, if the channel separation capability of demultiplexing section 15 is for a relatively wide channel spacing (e.g. 100 GHz grid) while channels in WDM system 1 are densely spaced (e.g. 50 GHz), then RPA section 14 could include the routing stage 90 shown in FIG. 7. Other structures may be added to RPA section 14 depending on the channel separation capability of demultiplexing section 15.

Routing stage 90 includes three router modules 91–93. Each router module 91–93 separates the respective band into two sub-bands, each sub-band including half of the channels of the corresponding band. For example, if the BB band includes sixteen (16) channels $\lambda_1$–$\lambda_{16}$, each separated by 50 GHz, then router module 91 would split the BB band into a first sub-band BB' having channels $\lambda_1, \lambda_3, \ldots, \lambda_{15}$ separated by 100 GHz and a second sub-band BB" having channels $\lambda_2, \lambda_4, \ldots, \lambda_{16}$ separated by 100 GHz and interleaved with the channels in the sub-band BB'. In a similar fashion, router modules 92 and 93 would split the RB1 band and the RB2 band, respectively, into first sub-bands RB1' and RB2' and second sub-bands RB1" and RB2".

Each router module 91–93 may, for example, include-a coupler (not shown) that has a first series of Bragg gratings attached to a first port and a second series of gratings attached to a second port. The Bragg gratings attached to the first port would have reflection wavelengths that correspond to every other channel (i.e. the even channels), while the Bragg gratings attached to the second port would have reflection wavelengths that correspond to the remaining channels (i.e. the odd channels). This arrangement of gratings will also serve to split the single input path into two output paths with twice the channel-to-channel spacing.

After passing through RPA section 14, the BB, RB1 and RB2 bands or their respective sub-bands are received by demultiplexing section 15. As shown in FIG. 8, demultiplexing section 15 includes six wavelength demultiplexers (WDs) 95', 95", 96', 96", 97', 97" which receive the respective sub-bands BB', BB", RB1', RB1", RB2' and RB2" and generate the output channels 17. Demultiplexing section 15 further includes receiving units Rx1–Rx128 for receiving the output channels 17.

The wavelength demultiplexers preferably comprise arrayed waveguide grating devices, but alternate structures for achieving the same or similar wavelength separation are contemplated. For instance, one may use interferential filters, Fabry-Perot filters, or in-fiber Bragg gratings in a conventional manner to demultiplex the channels within the sub-bands BB', BB", RB1', RB1", RB2', RB2".

In a preferred configuration, demultiplexer section 15 combines interferential filter and AWG filter technology. Alternatively, one may use Fabry-Perot filters or in-fiber Bragg gratings. WDs 95', 95", which are preferably eight channel demultiplexers with interferential filters, receive and demultiplex first sub-band BB' and second sub-band BB", respectively. Specifically, WD 95' demultiplexes channels $\lambda_1, \lambda_3, \ldots, \lambda_{15}$, and WD 95" demultiplexes channels $\lambda_2, \lambda_4, \ldots, \lambda_{16}$. Both WD 95' and WD 95", however, may be 1×8 type AWG 100 GHz demultiplexers. Similarly, WDs 96' and 96" receive and demultiplex first sub-band RB1' and second sub-band RB1", respectively, to produce channels $\lambda_{17}$–$\lambda_{64}$ and WDs 97' and 97" receive and demultiplex first sub-band RB2' and second sub-band RB2", respectively, to produce channels $\lambda_{65}$–$\lambda_{128}$. Both WD 96' and WD 96" may be 1×32 type AWG 100 GHz demultiplexers that are underequipped to use only twenty-four of the available demultiplexer ports and both WD 97' and WD 97" may be 1×32 type AWG 100 GHz demultiplexers that uses all the available demultiplexer ports. Output channels 17 are composed of the individual channels demultiplexed by WDs 95', 95", 96', 96", 97', 97", and each channel of output channels 17 is received by one of receiving units Rx1–Rx128.

Figure 9:
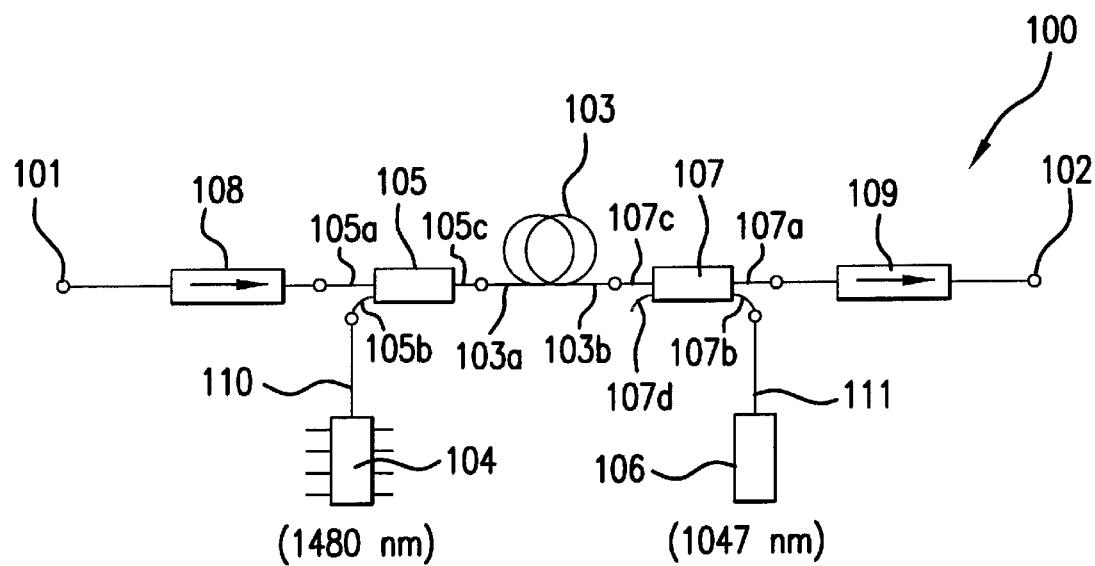
FIG. 9 is a schematic representation of an optical amplifying unit according to the present invention.

FIG. 9 illustrates an optical amplifier 100 according to the present invention. Optical amplifier 100 can be used in the optical transmission system 1, both in the amplifier section 53 of FIG. 4 and in the amplifier section 69 of FIG. 6, to amplify signals in the RB2 band.

Amplifier 100 is preferably a bidirectionally-pumped optical amplifier and includes:

an input port 101 for the input of optical signals to be amplified;

an output port 102 for the output of the optical signals after amplification;

an active fiber 103 having a first end 103a optically coupled to the input port 101 and a second end 103b optically coupled to the output port 102 and adapted to amplify the optical signals;

a first pump source 104 optically coupled to the active fiber 103 by means of a first optical coupler 105 and adapted to feed a first pump radiation to the active fiber 103, preferably in a co-propagating direction with respect to transmitted signals;

a second pump source 106 optically coupled to the active fiber 103 by means of a second optical coupler 107 and adapted to feed a second pump radiation to the active fiber 103, preferably in a counter-propagating direction with respect to transmitted signals.

Alternatively, by opportunely multiplexing the first pump radiation, the second pump radiation and the optical signal, the first pump radiation and the second pump radiation may be fed to the active fiber 103 in a same direction, preferably both in the co-propagating direction.

Alternatively, a plurality of pump sources may be used in place of the first pump source and/or the second pump source. This plurality of pump sources may be multiplexed either in wavelength (if operating at different wavelengths) or in polarization.

Amplifier 100 may also comprise a first optical isolator 108 of a known type positioned between input 101 and the first coupler 105, to allow light transmission only from input 101 to coupler 105, and/or a second optical isolator 109 of a known type positioned between the second coupler 107 and output 102, to allow light transmission only from the second coupler 107 to output 102.

Active fiber 103 is a silica fiber co-doped with erbium and ytterbium. Active fiber 103 is single-mode and has a length preferably comprised between 10 m and 30 m and a numeric aperture NA preferably comprised between 0.15 and 0.22. The core of active fiber 103 includes the following components with the indicated concentrations:

Al: between 0.1 and 13 atomic %;

P: between 0.1 and 30 atomic %;

Er: between 0.1 and 0.6 atomic %;

Yb: between 0.5 and 3.5 atomic %.

The ratio between erbium and ytterbium concentrations is preferably in the range between 1:5 and 1:30, for example 1:20.

The first coupler 105 is preferably a micro-optic interferential WDM coupler, including:

a first access fiber 105a optically coupled to the input port 101 to receive the signals (in the RB2 band channels) to be amplified;

a second access fiber 105b optically coupled to the first pump source 104 by means of a single-mode optical fiber 110, to receive the first pump radiation;

a third access fiber 105c optically coupled to the active fiber 103 to feed to the active fiber 103 the optical signals to be amplified together (and in a same propagation direction) with the first pump radiation The first coupler 105 further includes a converging lens system (not shown), to opportunely direct the light beams among its access fibers, and a selective-reflection surface (not shown), e.g. a dichroic mirror. The actual inclination of the reflection surface inside the coupler depends on the direction of the incoming optical beams carrying the signal and the pump radiation. Preferably, the selective-reflection surface in coupler 105 is transparent for the wavelengths of the RB2 band channels and reflecting for the wavelength of the first pumping radiation. In this way, the RB2 band channels pass through the reflecting surface substantially without losses while the first pump radiation is reflected by the reflecting surface into the core of the active fiber 103. Alternatively, the first coupler 105 may include a selective-reflection surface that is reflecting for the wavelengths of the RB2 band channels and transmissive for the wavelength of the first pumping radiation.

The first coupler 105 has preferably an insertion loss for the optical signals not greater than 0.6 dB. For example, the first coupler 105 may be model MWDM-45/54 made by Oplink.

According to another embodiment, the first coupler 105 may be a fused-fiber like coupler.

The second coupler 107 is preferably a fused fiber WDM coupler including:

a first access fiber 107a optically coupled to the output port 102 to feed to the output port 102 the amplified signals;

a second access fiber 107b optically coupled to the second pump source 106 by means of an optical fiber 111, to receive the corresponding pump radiation;

a third access fiber 107c optically coupled to the active fiber 103 to receive from the active fiber 103 the amplified optical signals and to feed to the active fiber 103 the pump radiation generated by the second pump source 106; and a fourth access fiber 107d having a free end, that is low-reflection terminated.

The second coupler 107 may be made by fusing a first fiber defining the first and the third access fiber 107a, 107c, and a second fiber defining the second and the fourth access fiber 107b, 107d.

The second coupler 107 has preferably an insertion loss for the optical signals not greater than 0.3 dB.

The first pump source 104 is preferably a semiconductor laser diode, providing the first pump radiation at a wavelength in the range between 1465 nm and 1495 nm, adapted to excite the Er ions in the active fiber 103. The pumping power provided by the first pump source 104 is preferably comprised between 40 mW and 150 mW. The first pump source 104 may be, for example, model number SLA5600-DA supplied by SUMITOMO ELECTRIC INDUSTRIES, Ltd.

Direct pumping of the Er ions, in particular co-directional pumping, is believed to originate a pre-amplification of the optical signals in the active fiber 103. This pre-amplification, in combination with a boosting effect provided by pumping the Yb ions, is believed to be the origin of the observed significant performance increase for the amplifier, in particular under low input power conditions.

The Applicant has found that pumping directly the Er ions in the 1480 nm band is preferable with respect to pumping in the 980 nm band. In fact, the 1480 nm pump radiation, differently from what would occur to a 980 nm pump radiation, is believed to be slowly absorbed in the active fiber so as to provide higher fluorescence at longer wavelengths (1600 nm). This allows the optical signal power to progressively rise along the active fiber avoiding an excessive ASE accumulation.

The proposed amplifier is able, as hereinbelow reported, to amplify optical signals with very low input powers, down to −25 dBm.

Figure 10:
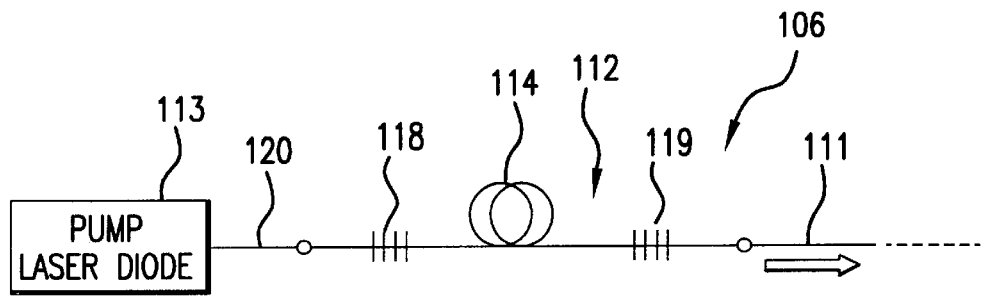
FIG. 10 is a schematic representation of a pump source included in the optical amplifying unit of FIG. 9.

With reference to FIG. 10, the second pump source 106 preferably includes a fiber laser 112 and a pump laser diode 113. Advantageously, fiber laser 112 is adapted to generate the second pump radiation at a wavelength in the range between 1000 nm and 1100 nm, adapted to excite the Yb ions in the active fiber 103. Fiber laser 112 preferably comprises a double-cladding fiber 114 and a first and a second Bragg grating 118, 119. Bragg gratings 118, 119 are written into opposite ends of double-cladding fiber 114 and delimit the Fabry-Perot resonant cavity of the fiber laser 112.

Pump laser diode 113 is optically coupled to one end of the double-cladding fiber 114 and is adapted to generate an exciting radiation for pumping the double-cladding fiber 114. The opposite end of double-cladding fiber 114 is spliced to fiber 111 for transmitting the second pump radiation to active fiber 103.

FIG. 1 a shows a not-in-scale cross section of double-cladding fiber 114. Fiber 114 includes a core 115 having a first refraction index $n_1$, an inner cladding 116 surrounding the core 115 and having a second refraction index $n_2 < n_1$, and an outer cladding 117 surrounding the inner cladding 116 and having a third refraction index $n_3 < n_2$. Core 115, inner cladding 116 and outer cladding 117 are coaxial.

Fiber 114 is a silica fiber having the core 115 preferably doped with a high concentration of Yb, in order to generate the second pump radiation at a wavelength suitable for pumping the active fiber 103. Yb concentration in core 115 is preferably greater than 0.1 atomic %, more preferably comprised between 0.7 atomic % and 1.5 atomic %.

The concentrations of the other components of core 115 are preferably within the following ranges:

Ge: between 0.1 and 20 atomic %;
Al: between 0.1 and 6 atomic %;
P: between 0.1 and 20 atomic %.

Pump laser diode 113 is preferably a broad-area laser, with emission spectrum centered at a wavelength suitable to pump dopant ions in the double-cladding fiber 114, preferably comprised between 910 nm and 925 nm. Pump laser diode 113 is preferably provided with an output multi-mode optical fiber 120 having the core substantially of the same diameter and with the same numeric aperture of the inner cladding 116 of active fiber 114, in order to couple the excitation radiation into the active fiber 114 with a very high efficiency (near 100%).

Figure 11A:
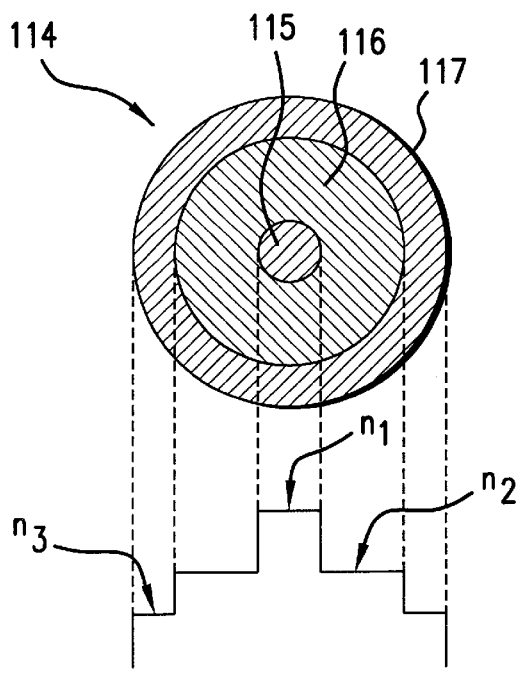
FIGS. 11a and 11b are schematic representations of a double-cladding fiber used for the pump source of FIG. 10 and of the multi-mode pumping operation of a double cladding fiber.
Figure 11B:
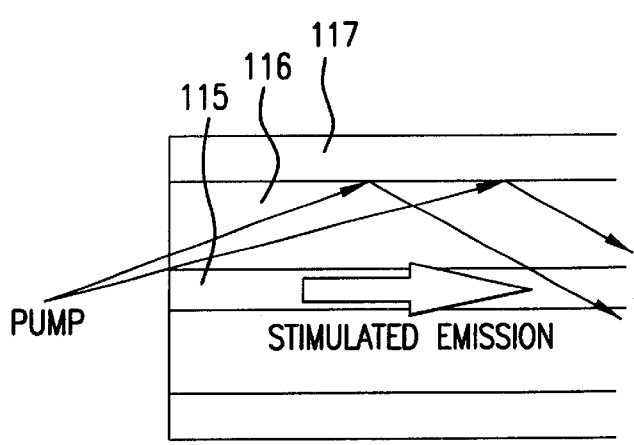

As shown in FIG. 11b, under normal operating conditions, the pump radiation generated by the pump laser diode 113 is fed into the inner cladding 116 and is progressively absorbed by the core 115, exciting the Yb ions. The de-excitation of the Yb ions gives rise to stimulated emission in the wavelength range 1000–1100 nm, which propagates into the core 115 and amplifies itself. Gratings 118, 119 reflect a predetermined wavelength in the range 1000–1100 nm (for example 1047 nm), giving rise, after multiple reflections, to a high power laser radiation at this specific wavelength which is emitted from the end of fiber 114 opposite to the pump laser diode 113.

Fiber laser 112 may be realized by firstly producing the double-cladding fiber 114 with characteristics (length, geometry and composition) optimized according to the desired laser performances, and successively writing gratings 118 and 119 on the opposite ends of fiber 114.

To produce fiber 114, two different preforms (not shown) are used. A first preform is used to obtain the core 115 and an inner portion of the inner cladding 116. The first preform is made by deposing $SiO_2$, $P_2O_5$ and $Al_2O_3$ by means of the known "chemical vapor deposition" (CVD) method, and then by introducing the rare earth ytterbium by means of the known "solution doping" method. The first preform is then opportunely worked to reduce its external diameter to a predetermined value.

A second preform of a commercial-type is used to obtain an outer portion of the inner cladding 116 and the outer cladding 117. The second preform has a central region of pure $SiO_2$ and a surrounding region of fluoride-doped $SiO_2$. The central region of the second preform is partly removed so as to obtain a central longitudinal hole having a diameter slightly larger than the external diameter of the first preform, into which the first preform is introduced. The inner cladding is defined partly from the first preform and partly from the second preform.

The three-layer preform so obtained is drawn in the usual way to obtain the optical fiber 114.

Gratings 118 and 119 may be written by means of a grating writing assembly 130 shown in FIG. 12 and according to the technique hereinbelow described, developed by the Applicant.

Figure 12:
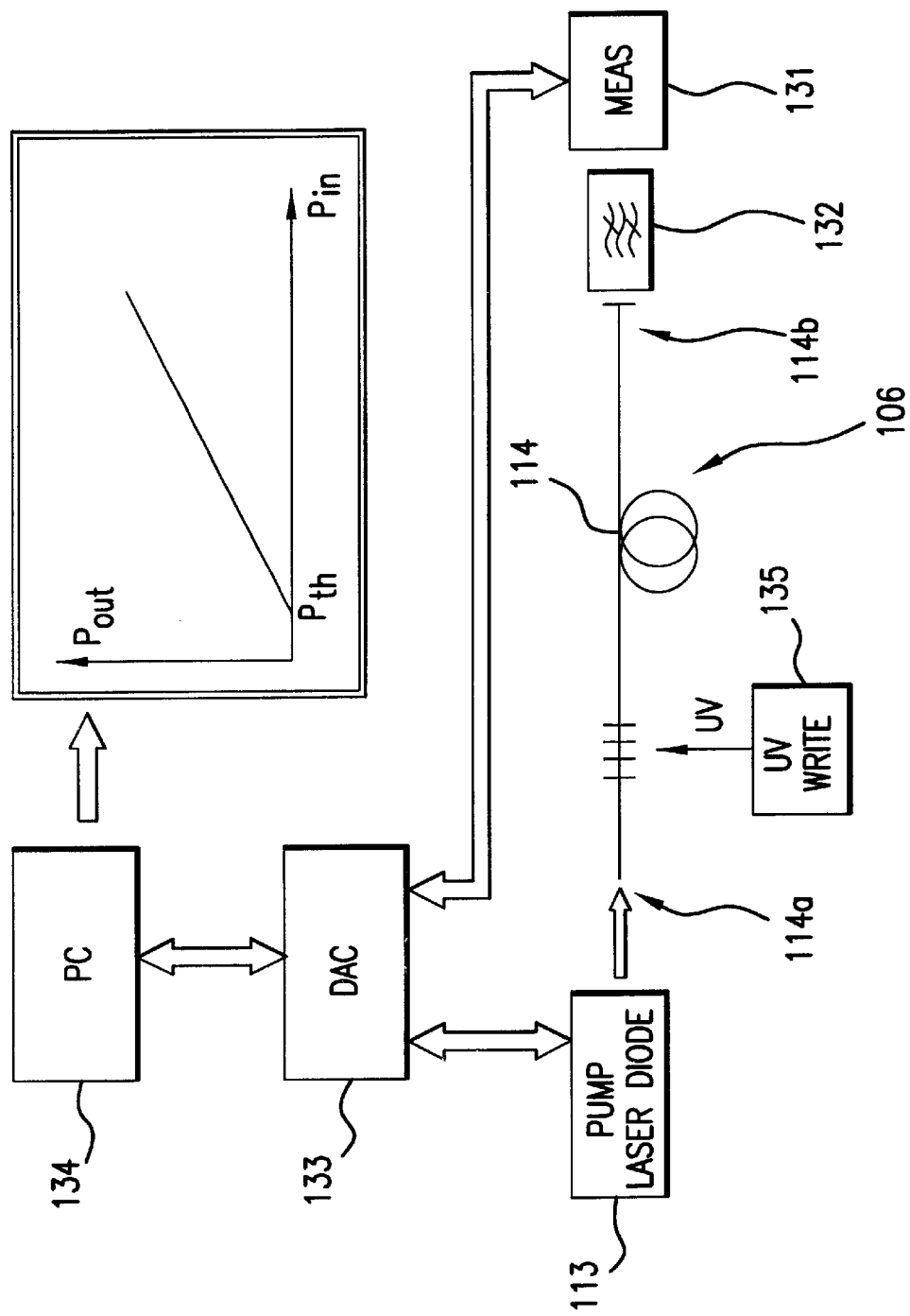
FIG. 12 shows a grating writing assembly used to write gratings in the double-cladding fiber of the pump source of FIG. 10.

With reference to FIG. 12, the grating writing assembly 130 the pump laser diode 113 optically coupled to a first end 114a of fiber 114, an optical power measuring device 131, preferably a power meter, positioned in front of a second end 114b of fiber 114 and, preferably, an optical band-pass filter 132 interposed between the second end 114b of fiber 114 and the measuring device 131.

Measuring device 131 is, for example, a power meter of the type ANDO AQ2140.

Filter 132 is preferably an interferential filter, centered at the predetermined wavelength for the laser emission $\lambda_{laser}$ of source 106.

Assembly 130 further includes a processor (PC) 134 adapted to control the pump laser diode 113 and the device 131 preferably by means of a DAC (Digital-Analog Converter) 133 and using a specific software (for example Labview®). DAC 133 may be for example of the type National Instruments PCI 6110E. As shown in FIG. 12, processor 134 is further adapted to provide (on a display) the $P_{out}/P_{pump}$ characteristic of laser 106 during grating writing process, according to information provided by the measuring device 131.

Moreover, assembly 130 includes a UV writing device 135 suitable to write gratings 118, 119 on fiber 114. UV writing device 135 includes preferably an excimer laser equipment.

Figure 16:
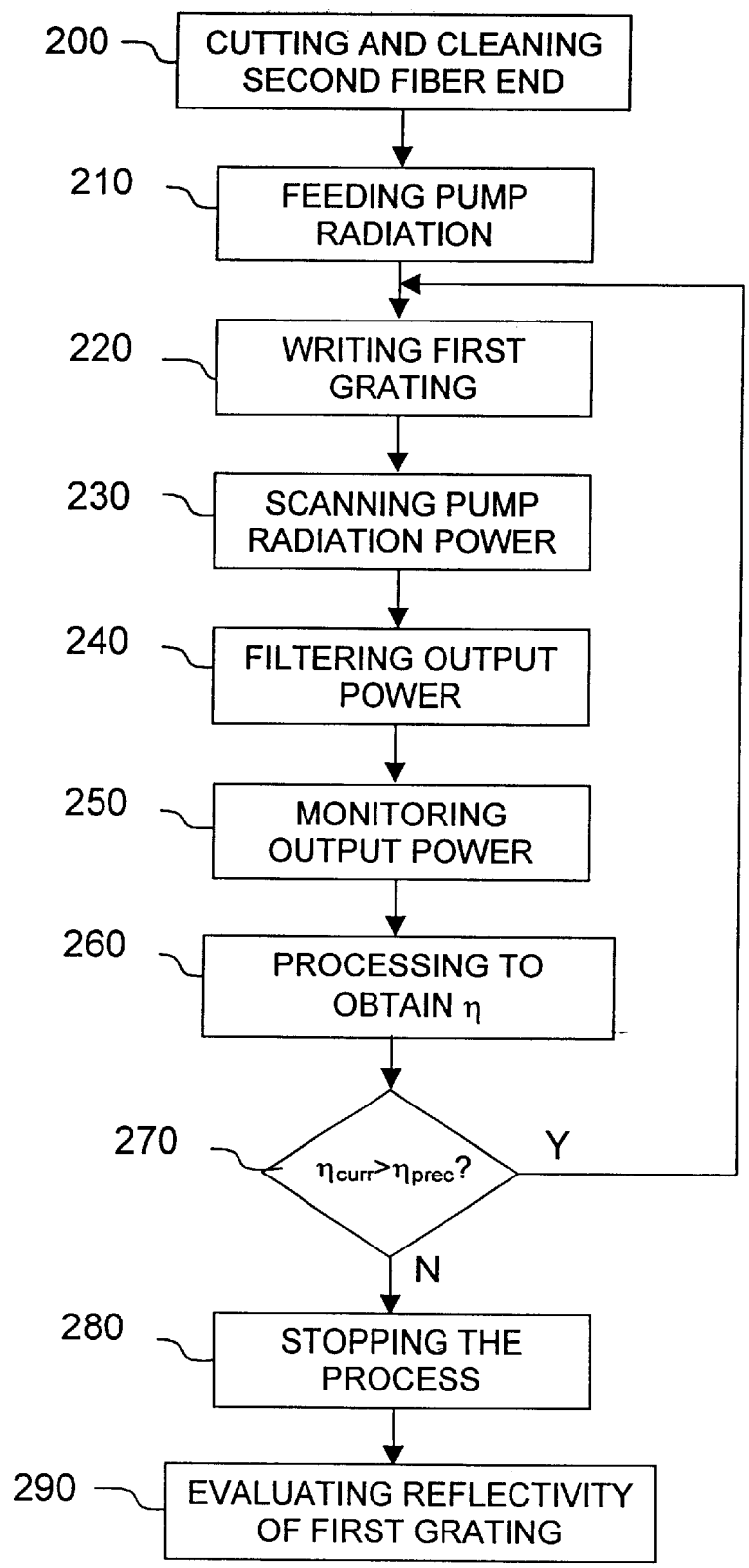
FIGS. 16 and 17 are flux diagrams of a method for writing gratings in an active fiber used for the pump source of FIG. 10.
Figure 18A:
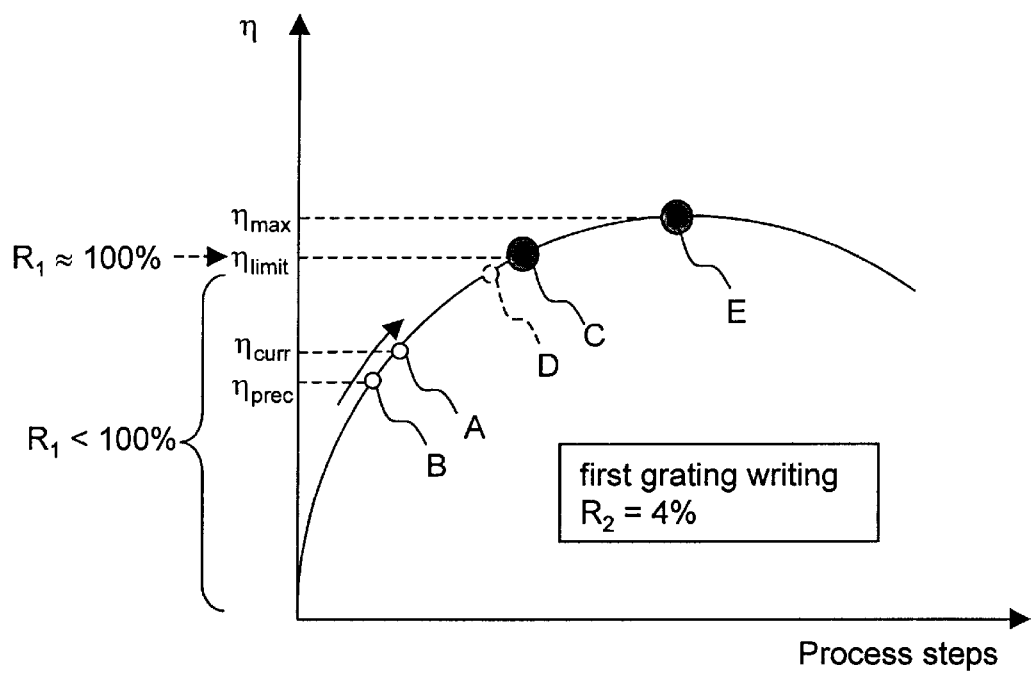
FIGS. 18a and 18b show schematically the variation of a predetermined parameter during the grating writing process according to the method of FIGS. 16 and 17.

The method for writing the first grating 118 is herein described with reference to the flux diagram of FIG. 16 and to the schematic representation of FIG. 18a. The method includes the following steps:

defining a reflecting surface associated to the active fiber, preferably by cutting and cleaning (block 200) the second end 114b of fiber 114 in order to reach a predetermined reflectivity $R_2$ at the interface glass/air, preferably of about 4%; this reflecting surface has a reflection wavelength band wider than the reflection wavelength band expected for the first grating;

feeding (block 210) pump radiation having an optical power $P_{in}$ to the active fiber 114 by means of the pump laser diode 113 in order to excite the dopant ions and to give rise to an amplified stimulated emission (ASE) defining a free-running emission;

writing (block 220), by means of UV writing device 105, the first grating 118 near the first end 114a of fiber 114, with a spatial period corresponding to the predetermined laser wavelength $\lambda_{laser}$; the first grating 118 has a varying reflectivity $R_1$ and defines, together with the second end 114b of fiber 114, a resonant cavity allowing the stimulated emission to travel forward and backward in fiber 114 and to output as a laser emission at the wavelength $\lambda_{laser}$;

scanning (block 230) repeatedly, during the writing step, the power of the pump radiation in a predetermined power range (possibly starting with zero power), by driving the pump laser diode 113 by means of processor 134 and DAC 133; the minimum value of the pump radiation power to have laser emission defines a threshold power $P_{th}$ which depends on the grating intensity; the scanning period may be, for example, 15–20 s;

spectrally filtering (block 240) the optical radiation which is output from the second end 114b of fiber 114, by means of filter 132; filtering allows to suppress residual pump radiation and, at the beginning of the writing process, the free running radiation;

measuring (block 250), during the writing and scanning steps, the optical power of the filtered output radiation, by means of the measuring device 131; measuring the optical power includes obtaining, during a scanning period, a predetermined number N (for example 10) of optical power values, each value being obtained by calculating the average value of the power detected in a predetermined measuring period (for example 2 s); the predetermined number N of optical power values and the predetermined measuring period being related to the value of the scanning period;

processing (block 260), preferably by performing a linear regression, the measured optical power in order to obtain the laser's efficiency η and threshold power $P_{th}$; performing the linear regression comprises finding a straight line which defines a best-fitting of the N last points (corresponding to the N optical power values obtained during the last scanning period) on the $P_{out}/P_{in}$ characteristic, and evaluating the slope and the intersection of the straight line with the $P_{in}$ axis in order to obtain current values of η and $P_{th}$;

checking (block 270) if the efficiency η is increasing, by comparing the current value of η ($η_{curr}$, point A in FIG. 18a), i.e. the value of η related to the last scanning period, with the preceding value of η ($η_{prec}$, point B in FIG. 18a), i.e. the value obtained in the preceding step of processing and related to the preceding scanning period; the current value $η_{curr}$ of efficiency η is related to the current value of the first grating reflectivity $R_1$;

repeating, if the efficiency η is increasing ($η_{curr} > η_{prec}$), the steps of writing, scanning, filtering, monitoring, processing and checking (blocks 220–270);

stopping the process (block 280) when the laser's efficiency η begins to degrade, i.e. if the efficiency η is no more increasing ($η_{curr} \leq η_{prec}$) having reached a limit value $η_{limit}$ (point C in FIG. 18a); $η_{limit}$ corresponds to a maximum value for the reflectivity $R_1$ of the first grating 108 (near 100%) and is the maximum efficiency obtainable with the considered value of $R_2$ (4%); if the writing process were continued over this point, η would decrease (point D in FIG. 18a) due to a grating degradation related to some incoming phenomena, like saturation of defect centers and reduction of interference fringe contrast;

evaluating (block 290), according to the efficiency limit value $η_{limit}$, the final reflectivity of the first grating 118.

The described process for writing the first grating may have a total duration of a few minutes.

The first grating has preferably a reflection wavelength band between 0.3 nm and 1 nm, more preferably between 0.4 and 0.7 nm.

The reflecting surface used in the first step may alternatively be defined by a multi-layer interferential reflecting surface made on the second end 114b, a separate portion of fiber including a grating, micro-optic elements like semi-reflecting mirrors or lens systems, or similars.

The Applicant has observed that the threshold power $P_{th}$ is another parameter that can be used, for example in addition to the efficiency, to establish when the first grating writing must be stopped. In fact, the threshold power $P_{th}$ decreases during the writing process and reaches a limit value $P_{th,limit}$ when the efficiency reaches its limit value $η_{limit}$. However, the Applicant has observed that the evaluation of $P_{th}$ is more difficult than the evaluation of η and that the variations of $P_{th}$ during the writing process are less than the variations of η. Moreover, the actual value of $P_{th}$ is slightly different from the value obtainable from the linear regression. Therefore, the Applicant has observed that η is the preferred parameter to be used in the checking step.

Typically, the limit efficiency $η_{limit}$ obtained at the end of the above process does not correspond to the maximum efficiency $η_{max}$ obtainable for the fiber laser 112 (point E in FIG. 18a). In order to reach the maximum efficiency $η_{max}$, it is typically necessary to write the second grating 119 and to optimize its reflectivity.

Writing only the first grating 118 may be sufficient in some applications in which the reflectivity of the second end of active fiber 114 allows to define a laser cavity with the desired characteristics. For example, the 4% reflectivity of the second end of active fiber 14 may be sufficient for a "in-air" laser, i.e., a laser whose output radiation is emitted directly in air.

For the considered use, the Applicant has observed that the presence of a second grating 119 having a reflectivity of at least 4% allows an improvement in the performance of the fiber laser 112.

The Applicant has further observed that the previously described writing technique is also suitable for writing the second grating 119, even if an additional attention must be paid to the second grating 119 actual spectral allocation. This is because the active fiber 114, during the writing step, changes its refraction index. and the grating wavelength peak then shifts. For remedying to this drawback, the second grating 119 is advantageously a relatively large band grating, so that the peak shifts are included in the grating's band. Preferably, the ratio between the reflecting band of the second grating and the reflecting band of the first grating is between 1.5 and 3. If the "phase mask" writing technique is used, a grating with an enlarged reflection band may be obtained by positioning, in front of the mask, a screen provided of a slit, which introduces a predetermined diffraction of the UV radiation.

Moreover, it is preferred to make an a priori evaluation of the possible peak shift during writing in order to reach an overlap of the peak related to the first grating 118 and the peak related to the second grating 119. This evaluation can be made by estimating the required duration of the writing process and the approximate shift per second of the grating peak.

Figure 17:
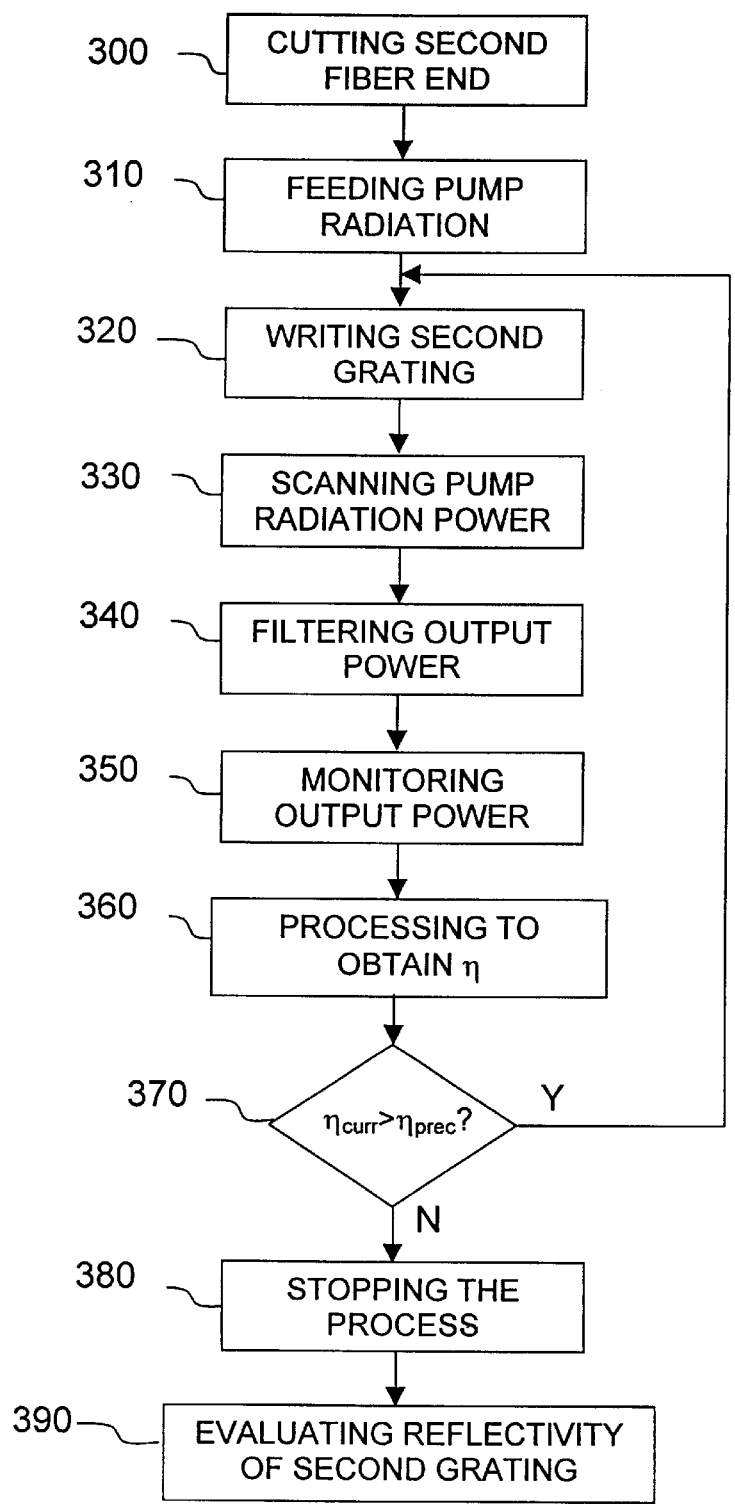
Figure 18B:
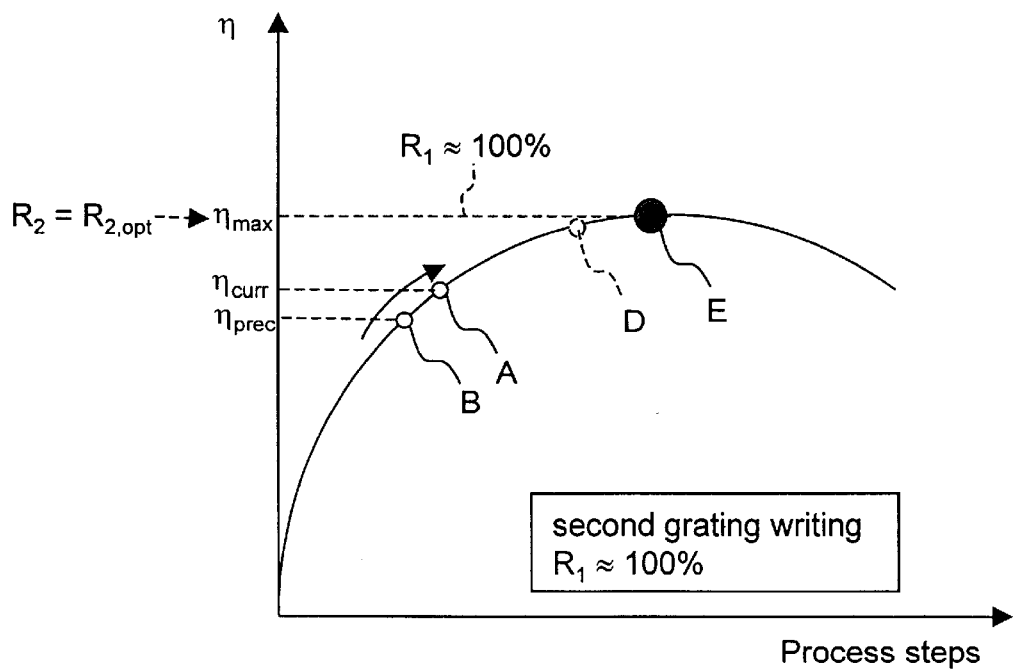

The method for writing the second grating 119 is herein described with reference to the flux diagram of FIG. 17 and to the schematic representation of FIG. 18b. The method includes the following steps:

cutting (block 300) the second end 114b of active fiber 114 to obtain and end surface inclined with an angle of 7–8° (with respect to a plane perpendicular to the fiber axis) having a negligible reflectivity;

feeding (block 310) pump radiation having an optical power Pin to the active fiber 114 by means of the pump laser diode 113 in order to excite the dopant ions of the active fiber 114;

writing (block 320), by means of UV writing device 105, the second grating 119 near the second end 114b of fiber 114, with a spatial period corresponding to the predetermined laser wavelength $λ_{laser}$; the second grating 119 has a varying reflectivity $R_2$ and defines, together with the first grating 118 which has a reflectivity $R_1$ near 100%, a resonant cavity allowing the stimulated emission to travel forward and backward in fiber 114 and to output as a laser emission at the wavelength $λ_{laser}$;

scanning (block 330) repeatedly, during the writing step, the power of the pump radiation in a predetermined power range (which may be different from the range used for the first grating writing), by driving the pump laser diode 113 by means of processor 134 and DAC 133; the minimum value of the pump radiation power to have laser emission defines a threshold power $P_{th}$ which depends on the second grating intensity;

spectrally filtering (block 340) the optical radiation which is output from the second end 114b of fiber 114, by means of filter 132; filtering allows to suppress residual pump radiation and, at the beginning of the second grating writing, the possible free running radiation;

measuring (block 350), during the writing and scanning steps, the optical power of the filtered output radiation, by means of the measuring device 131; measuring the optical power includes obtaining, during a scanning period, a predetermined number N' (which may be different from the predetermined number N used for the first grating writing) of optical power values, each value being obtained by calculating the average value of the power detected in a predetermined measuring period; the predetermined number N' of optical power values and the predetermined measuring period being related to the duration of the scanning period;

processing (block 360), preferably by performing a linear regression, the measured optical power in order to obtain the laser's efficiency η and threshold power $P_{th}$; performing the linear regression comprises finding a straight line which defines a best-fitting of the N' last points (corresponding to the N' optical power values obtained during the last scanning period) on the $P_{out}/P_{in}$ characteristic, and evaluating the slope and the intersection of the straight line with the $P_{in}$ axis in order to obtain current values of η and $P_{th}$; the first detected value of η will be intermediate between zero and the limit value $\eta_{limit}$ found at the end of the first grating writing;

checking (block 370) if the efficiency η is increasing, by comparing the current value of η ($\eta_{curr}$, point A in FIG. 18b), i.e. the value of η related to the last scanning period, with the preceding value of η ($\eta_{prec}$, point B in FIG. 18b), i.e. the value obtained in the preceding step of processing and related to the preceding scanning period; the current value $\eta_{curr}$ of efficiency η is related to the current value of the second grating reflectivity $R_2$;

repeating, if the efficiency η is increasing ($\eta_{curr} > \eta_{prec}$), the steps of writing, scanning, filtering, monitoring, processing and checking (blocks 320–370);

stopping the process (block 380) when the laser's efficiency η begin to degrade, i.e. if the efficiency η is no more increasing ($\eta_{curr} \leq \eta_{prec}$) having reached a maximum value $\eta_{max}$ (point E in FIG. 18b); $\eta_{max}$ corresponds to an optimum value $R_{2,opt}$ for the reflectivity $R_2$ of the second grating 109 (for example included between 4 and 10%) and represents the maximum efficiency obtainable for the fiber laser 112; if the writing process were continued over this point, η would decrease (point D in FIG. 18b) due to a grating degradation related to some incoming phenomena, like saturation of defect centers and reduction of interference fringe contrast;

evaluating (block 390), according to the maximum value of efficiency $\eta_{max}$, the final reflectivity of the second grating 119.

The Applicant has observed that, during the second grating writing process ($R_2$ increasing), the threshold power $P_{th}$ progressive decreases and this trend continues over the optimum value $R_{2,opt}$. Having a lower value of the threshold power $P_{th}$ is an advantage in that it allows lasering with a lower input power. Thus, a further improved criterion to optimize the fiber laser 112 performances would be that of stopping the process when the best compromise, or a predetermined relation, between the efficiency η and the threshold power $P_{th}$ has been reached.

This compromise may depend on the particular application considered.

Experimental Results on Amplifying unit 100 Performances

Experimental measurements have been carried out on an amplifying unit 100 whose characteristics are hereinbelow described in detail.

An active fiber 103 used in the experiment has a core diameter of 4.3 μm, a cladding diameter of 125 μm, a numeric aperture NA=0.2 and is composed as follows:

| element | Si | Al | P | Er | Yb |
|---|---|---|---|---|---|
| atomic % | 70.8 | 1.5 | 25 | 0.125 | 2.5 |

The ratio of Er and Yb concentrations is about 1:20.

The first coupler 105 is an interferential filter model MWDM-45/54 made by OPLINK. The first coupler 105 has an insertion loss of 0.6 dB.

The second coupler 107 is a fused fiber WDM coupler. The second coupler 107 is, according to the above, made by fusing a first fiber defining access fibers 107a and 107c and a second fiber defining access fibers 107b and 107d. The first fiber is a SM (single-mode) fiber having a core diameter of 3.6 μm, a cladding diameter of 125 μm and a numeric aperture NA=0.195. The second fiber is a SM fiber having a core diameter of 3.6 μm, a cladding diameter of 125 μm and a numeric aperture NA=0.195. Both SM fibers are of the type CS 980 produced by Corning. The second coupler 107 has an insertion loss of 1 dB.

The first pump source 104 is a laser diode adapted to provide a pump radiation power of 50–70 mW at 1480 nm. Fiber 110 is a SM fiber.

The second pump source 106 has been made by the Applicant and is adapted to provide a pump radiation power of 500–650 mW at 1047 nm. Fiber 111 is a SM fiber. Broad area diode laser 113 is adapted to provide a radiation power of 800 mW at 915 nm. The Applicant observes that a much higher saturation power of the amplifier could probably be obtained by using a more powerful broad area diode laser.

Active fiber 114 in the second pump source has, in its core 115, the following composition, detected by means of a SEM analysis.

| element | Si | Al | P | Er | Yb |
|---|---|---|---|---|---|
| atomic % | 89.40 | 2.78 | 1.17 | 5.93 | 0.72 |

Al concentration has been chosen relatively high in order to obtain a high concentration of Yb. Ge concentration is relatively low, due to the high value of the refraction index determined by the high concentration of Al and Yb. P has been added in order to reduce the numeric aperture (NA) of the fiber.

The length of active fiber 114 is 10 m and its bending diameter is about 40 mm. The Applicant has observed that this value of the bending diameter represent the best compromise between absorbing efficiency and induced losses in the fiber.

The length of the resonant cavity (i.e. the distance between the first and the second grating 118, 119) is approximately 10 m.

The active fiber 114 has an external diameter of the outer cladding 117 of about 90 μm, an external diameter of the inner cladding 116 of about 45 μm and an external diameter of the core 115 of about 4.5 μm. The refraction index step $\Delta n = n_1 - n_2$ between the core 115 and the inner cladding 116 is about 0.0083 and the refraction index step $\Delta n' = n_2 - n_3$ between the inner cladding 116 and the outer cladding 117 is about 0.067. The core 115 and the inner cladding 116 define a single-mode waveguide for the conveying of transmission signals, having a first numeric aperture $NA_1$ of about 0.155, while the inner cladding 116 and the outer cladding 117 define a multi-mode waveguide for the conveying of pump radiation, having a second numeric aperture $NA_2$ of about 0.22.

Gratings 118, 119 have been realized by the method previously described. Gratings 118, 119 have a Bragg wavelength of 1047 nm. The first grating 118 has a reflectivity of about 99% at peak wavelength and the second grating 119 has a reflectivity less then 10% at the same wavelength.

Figure 13:
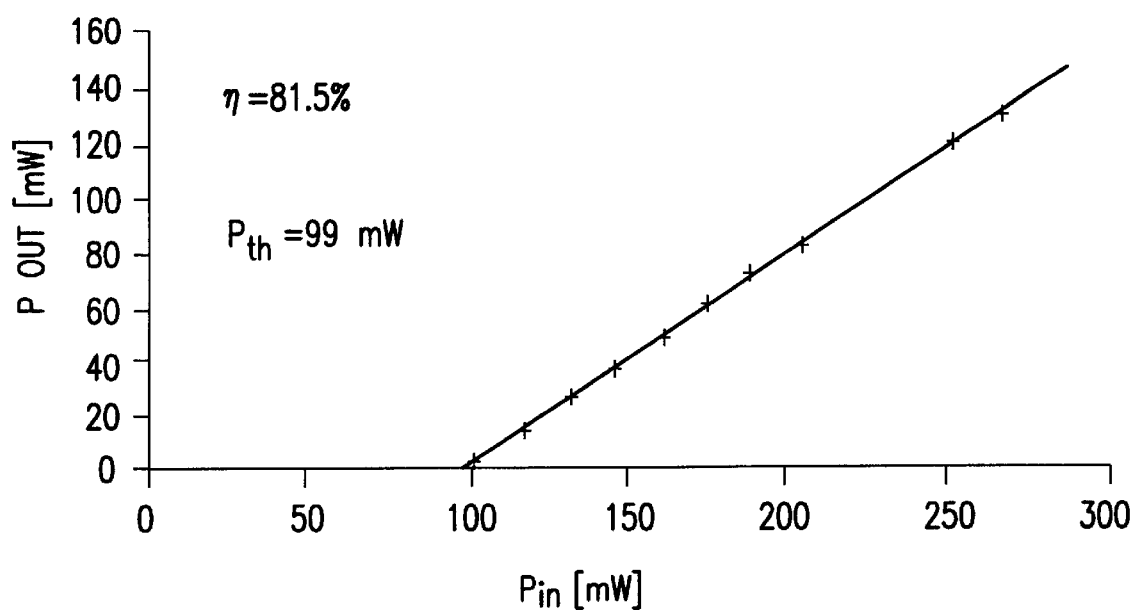
FIG. 13 shows the response curve of a fiber laser used for experimental measurements.

FIG. 13 shows the response curve of fiber laser 112. In particular, FIG. 13 shows the dependence of the optical power $P_{out}$ of the emitted laser radiation on the pump power $P_{in}$ provided by laser diode 113. According to the obtained curve, the laser source has an efficiency η=81,5% and a threshold power $P_{th}$=99 mW.

Figure 14:
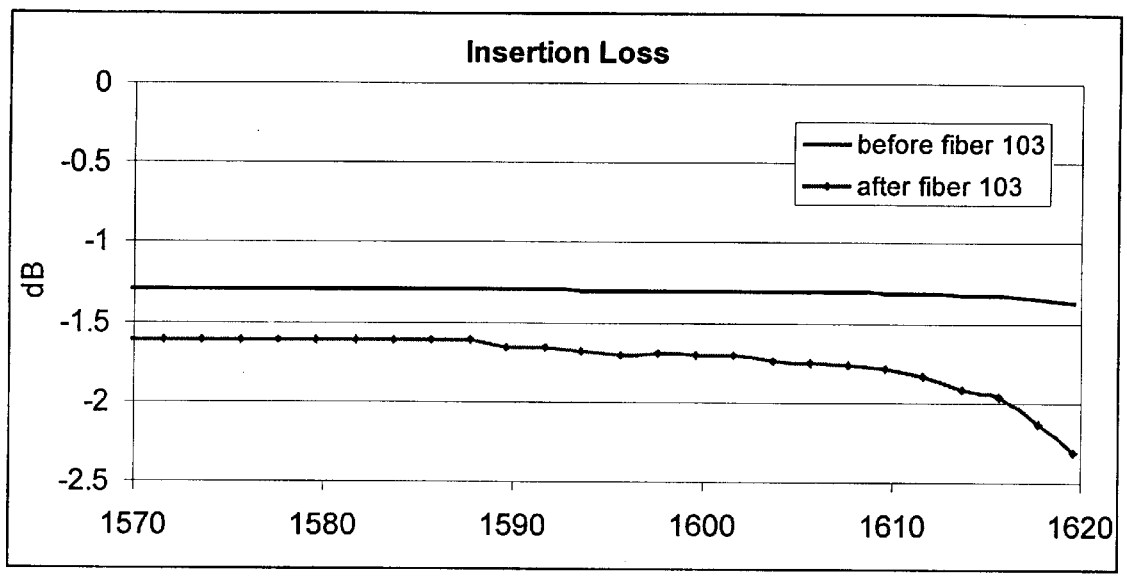
FIGS. 14 and 15 illustrate experimental results obtained with an amplifying unit according to the invention.

FIG. 14 shows the insertion losses due to the passive components of the amplifier 100 placed, respectively, between the input 101 and the first end of the fiber 103 (i.e. the first optical isolator 108 and the first optical coupler 105), and between the second end of the fiber 103 and the output 102 (i.e. the second optical coupler 107 and the second optical isolator 109). The characteristics of FIG. 14 have been obtained by means of an optical spectrum analyzer.

Figure 15:
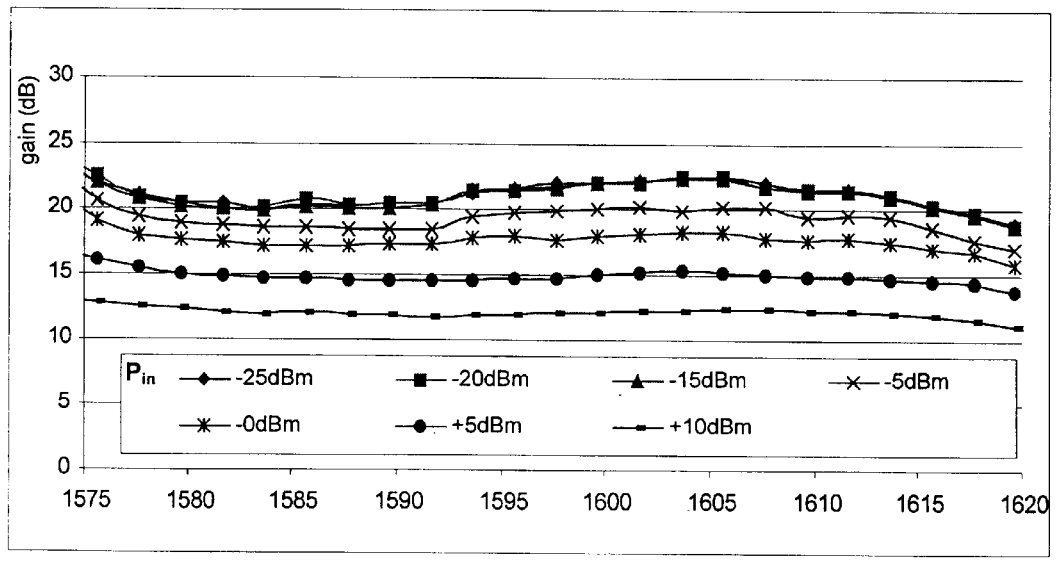

FIG. 15 shows the gain curves of the amplifying unit 100, for a wavelength scanning of the input signal from 1575 nm to 1620 nm. The different curves in FIG. 15 refer to input signal powers within the range −25 dBm and 10 dBm. It can be noticed that, for input signal power greater than 0 dBm, the amplifying unit 100 provides output power greater than about 18 dBm and can then be used as a booster amplifier. In particular, at 10 dBm of input signal power, the unit provides up to 22 dBm output power with a maximum gain variation less than 1 dB in the RB2 band.

When amplifier 100 is used as a booster unit, with an input signal of 10 dBm or more, the gain curve exhibits a maximum variation less than 1 dB in the RB2 band.

Moreover, the amplifier 100 exhibits a gain extended beyond the RB2 band, as far as 1620 nm.

Numerical Results of Grating Writing Method Simulation

Figure 19:
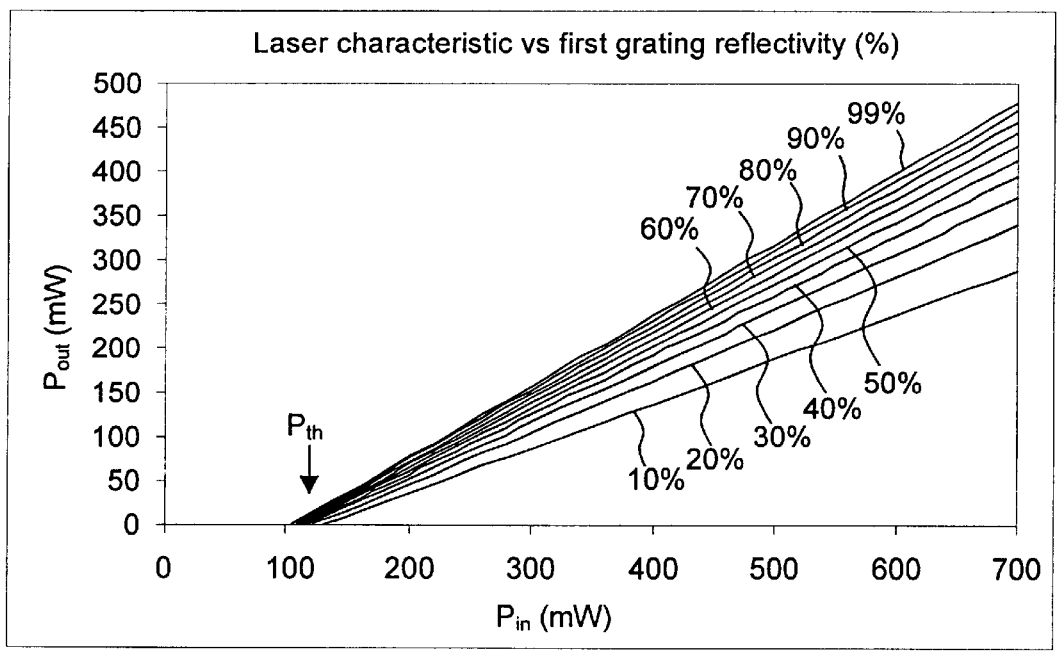
FIGS. 19–21 show the simulated performances of a fiber laser used for the pump source of FIG. 10.
Figure 20:
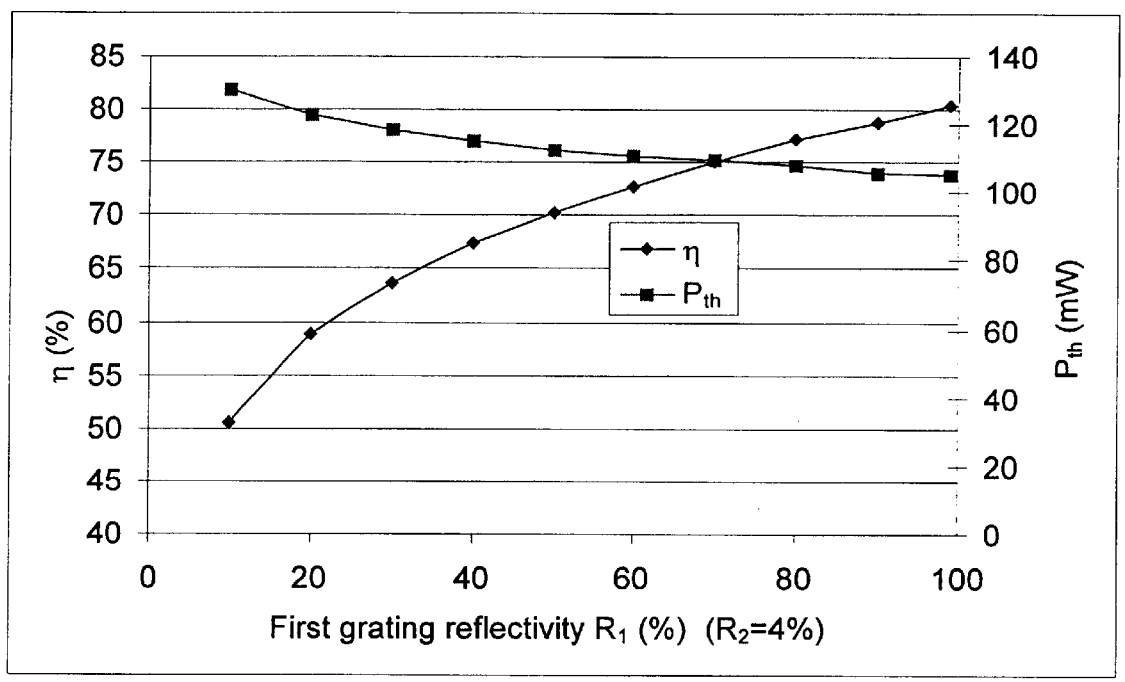
Figure 21:
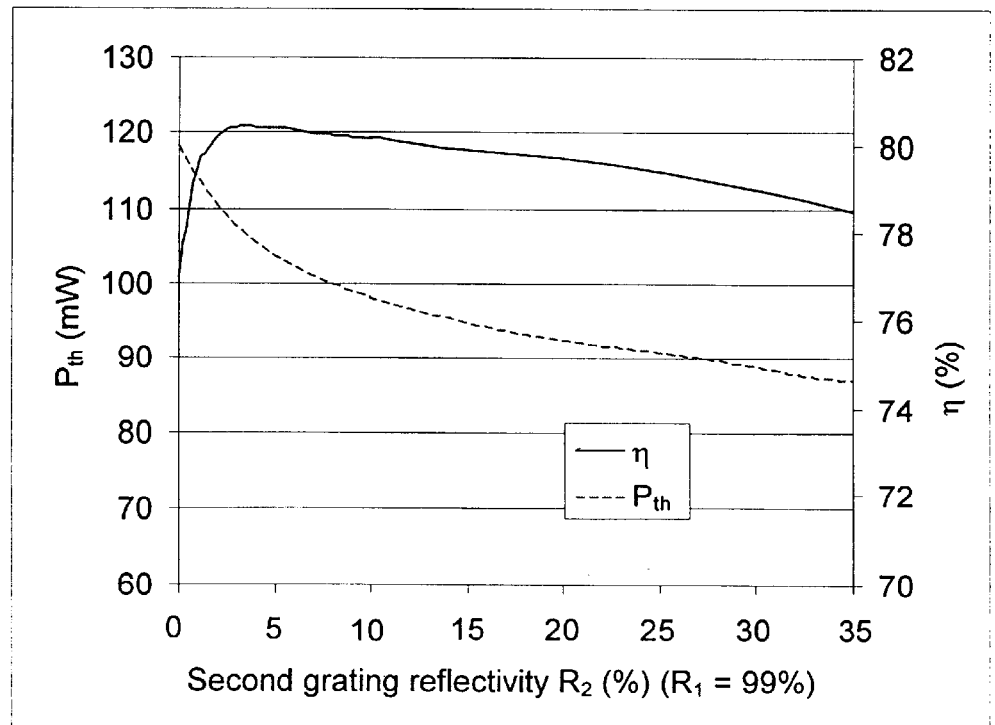

FIGS. 19–21 illustrates numerical results obtained by simulating the above described grating writing method on an active fiber 114 having the characteristics hereinabove listed in the experimental measurement.

FIG. 19 shows the dependence of optical output power $P_{out}$ on the pump optical power $P_{in}$ for different values of the first grating reflectivity during the first grating writing process. The resonant cavity is defined by the first grating 118 and the second end 114b (4% reflectivity) of fiber 114. It can be observed the progressive increase of the fiber laser efficiency and the progressive decrease of the threshold power $P_{th}$ with the increase of the first grating reflectivity.

FIG. 20 shows the dependence of efficiency η and threshold power $P_{th}$ of fiber laser 112 on the first grating reflectivity during the first grating writing process. Each point on the η and $P_{th}$ characteristics corresponds to a straight line of FIG. 19.

FIG. 21 shows the dependence of efficiency η and threshold power $P_{th}$ of fiber laser 112 on the second grating reflectivity during the second grating writing process, in the assumption of a first grating reflectivity of 99%. A maximum in the efficiency curve is detectable for a second grating reflectivity of about 4%, having a value greater than 80%. If the best compromise (between η and $P_{th}$) criterion is used, the writing process should advantageously be stopped when the second grating reflectivity is between 4% and 10%.

What is claimed is:

1. Optical transmission system comprising:
   an optical transmitting unit (10) for transmitting optical signals,
   an optical receiving unit (20) to receive said optical signals,
   an optical fiber link (30) optically coupling said transmitting unit to said receiving unit and adapted to convey said optical signals, and
   an optical amplifying unit (100) coupled along said link, adapted to amplify said optical signals; said optical amplifying unit (100) comprising:
      an input (101) for the input of said optical signals,
      an output (102) for the output of said optical signals,
      an active fiber (103) having a core codoped throughout with Er and Yb, and having a first end (103a) optically coupled to said input (101) and a second end (103b) optically coupled to said output (102), for the amplification of said optical signals,
      a first and a second pump source (104, 106) for generating a first and, respectively, a second pump radiation, and
      a first and a second optical coupler (105, 107) for optically coupling said first pump source (104) and, respectively, said second pump source (106) to said active fibre (103),
         characterized in that said first pump radiation includes an excitation wavelength for Er and said second pump radiation includes an excitation wavelength for Yb, and the first pump radiation and the second pump radiation are fed throughout the core to excite Er and Yb, respectively.

2. Optical transmission system according to claim 1, characterized in that said optical amplifying unit has a wavelength amplification band above 1565 nm.

3. Optical transmission system according to claim 1, characterized in that said first optical coupler (105) is optically coupled to the first end (103a) of said active fiber (103) for feeding the first pump radiation to the active fiber (103) in a co-propagating direction with respect to optical signals and said second optical coupler (106) is optically coupled to the second end of said active fiber (103) for feeding the second pump radiation to the active fiber (103) in a counter-propagating direction with respect to optical signals.

4. Optical transmission system according to claim 1, characterized in that the active fiber is a single-cladding fiber.

5. Optical transmission system according to claim 1, characterized in that the active fiber is a single-mode fiber.

6. Optical transmission system according to claim 1, characterized in that the first pump radiation has a wavelength between 1465 nm and 1495 nm.

7. Optical transmission system according to claim 1, characterized in that the second pump radiation has a wavelength between 1000 nm and 1100 nm.

8. Optical transmission system according to claim 1, characterized in that the first optical coupler (105) is a micro-optic WDM coupler.

9. Optical transmission system according to claim 1, characterized in that the second optical coupler (107) is a fused-fiber WDM coupler.

10. Optical transmission system according to claim 2, characterized in that the wavelength amplification band extends over the long wavelength region from 1565 nm to 1620 nm.

11. Method for amplifying optical signals, comprising the steps of:
feeding the optical signals to an active fiber having a core codoped throughout with Er and Yb; and
optically pumping, during the step of feeding the optical signals, the active fiber,
characterized in that said step of optically pumping includes feeding throughout the core of said active fiber a first pump radiation for exciting Er and a second pump radiation for exciting Yb.

12. Method according to claim 11, characterized in that said step of feeding said first pump radiation includes feeding said first pump radiation to the active fiber in a co-propagating direction with respect to optical signals and said step of feeding said second pump radiation includes feeding said second pump radiation to the active fiber in a counter-propagating direction with respect to optical signals.

13. Method according to claim 11, characterized in that said step of feeding to said active fiber a first pump radiation includes feeding to said active fibre an exciting radiation for Er having a wavelength between 1465 nm and 1495 nm.

14. Method according to claim 11, characterized in that said step of feeding to said active fiber a second pump radiation includes feeding to said active fibre an exciting radiation for Yb having a wavelength between 1000 nm and 1100 nm.

15. Method according to claim 11, characterized in that said active fiber includes a core and a cladding and in that said step of feeding to said active fiber a first pump radiation and a second pump radiation includes feeding said first pump radiation and said second pump radiation into the core of said active fiber.

16. Method according to claim 11, characterized in that said step of feeding the optical signals to the active fiber includes feeding to the active fiber optical signals having wavelength above 1565 nm.

17. Method according to claim 16, characterized in that the active fiber optical signals fed to the active fiber extend over the long wavelength region from 1565 nm to 1620 nm.

18. Optical amplifying unit including:
an input (101) for the input of optical signals,
an output (102) for the output of said optical signals,
an active fiber (103) having a core codoped throughout with Er and Yb, optically connected to said input and said output, for amplifying said optical signals,
a first and a second pump source (104, 106) for generating a first and, respectively, a second pump radiation, and
a first and a second optical coupler (105, 107) for optically coupling said first pump source (104) and, respectively, said second pump source (106) to said active fibre,
characterized in that said first pump radiation includes an excitation wavelength for Er and said second pump radiation includes an excitation wavelength for Yb, and the first pump radiation and the second pump radiation are fed throughout the core to excite Er and Yb, respectively.

19. Optical amplifying unit according to claim 18, characterized in that the excitation wavelength for Er is between 1465 nm and 1495 nm and the excitation wavelength for Yb is between 1000 nm and 1100 nm.

20. Optical amplifying unit according to claim 18, characterized in that said first optical coupler (105) is connected between said input (101) and said active fiber (103) for feeding the first pump radiation to the active fiber (103) in a co-propagating direction with respect to optical signals and second optical coupler (107) is connected between said active fiber (103) and said output (102) for feeding the second pump radiation to the active fiber (103) in a counter-propagating direction with respect to the optical signals.

21. Optical amplifying unit according to claim 18, characterized in that said active fiber (103) is a single-cladding and single-mode fiber.

22. Optical amplifying unit according to claim 18, characterized in that said first optical coupler (105) is a micro-optic WDM coupler.

23. Optical amplifying unit according to claim 18, characterized in that the second optical coupler (107) is fused-fiber WDM coupler.

24. Optical amplifying unit according to claim 18, characterized in that said second pump source (106) comprises a fiber laser (112) including a further active fiber (114) and adapted to generate said second pump radiation, and a pump laser source (113) adapted to pump said further active fiber (114).

25. Optical amplifying unit according to claim 18, characterized in that said further active fiber (114) includes a double-cladding fiber.

26. Optical amplifying unit according to claim 18, characterized in that said further active fiber (114) includes an optical fiber doped with Yb.

27. Optical amplifying unit according to claim 18, characterized in that said fiber laser (112) includes a first and a second Bragg grating (118, 119) written on opposite end portions of said further active fiber (114).

28. Optical amplifying unit according to claim 18, characterized in that said pump laser source (113) is a broad-area laser diode.

29. An optical transmission system comprising:
an optical transmitting unit for transmitting optical signals,
an optical receiving unit for receiving said optical signals,
an optical fiber link optically coupling said transmitting unit to said receiving unit and for conveying said optical signals, and
an optical amplifying unit coupled along said link, for amplifying said optical signals, said optical amplifying unit comprising:
an input for the input of said optical signals,
an output for the output of said optical signals,
an active fiber having a core codoped throughout with Er and Yb, having a first end optically coupled to said input and a second end optically coupled to said output, for the amplification of said optical signals,
a first and a second pump source for generating a first and, respectively, a second pump radiation, and
a first and a second optical coupler for optically coupling said first pump source and, respectively, said second pump source to said active fiber, wherein said first pump radiation includes an excitation wavelength for Er, said second pump radiation includes an excitation wavelength for Yb, and the first pump radiation and the second pump radiation are fed throughout the core to excite Er and Yb, respectively.

30. The optical transmission system of claim 29, wherein said optical amplifying unit has a wavelength amplification band above 1565 nm.

31. The optical transmission system of claim 30, wherein the wavelength amplification band extends over the long wavelength region from 1565 nm to 1620 nm.

32. The optical transmission system of claim 29, wherein said first optical coupler is optically coupled to the first end of said active fiber for feeding the first pump radiation to the active fiber in a co-propagating direction with respect to optical signals, and said second optical coupler is optically coupled to the second end of said active fiber for feeding the second pump radiation to the active fiber in a counter-propagating direction with respect to optical signals.

33. The optical transmission system of claim 29, wherein the active fiber is a single-cladding fiber.

34. The optical transmission system of claim 29, wherein the active fiber is a single-mode fiber.

35. The optical transmission system of claim 29, wherein the first pump radiation has a wavelength between 1465 nm and 1495 nm.

36. The optical transmission system of claim 29, wherein the second pump radiation has a wavelength between 1000 nm and 1100 nm.

37. The optical transmission system of claim 29, wherein the first optical coupler is a micro-optic WDM coupler.

38. The optical transmission system of claim 29, wherein the second optical coupler is a fused-fiber WDM coupler.

39. A method for amplifying optical signals, comprising the steps of:
feeding the optical signals to an active fiber having a core codoped throughout with Er and Yb; and
optically pumping, during the step of feeding the optical signals, the active fiber, wherein said step of optically pumping includes feeding throughout the core of said active fiber a first pump radiation for exciting Er and a second pump radiation for exciting Yb.

40. The method of claim 39, wherein said step of feeding said first pump radiation includes feeding said first pump radiation to the active fiber in a co-propagating direction with respect to optical signals and said step of feeding said second pump radiation includes feeding said second pump radiation to the active fiber in a counter-propagating direction with respect to optical signals.

41. The method of claim 39, wherein said step of feeding to said active fiber a first pump radiation includes feeding to said active fiber an exciting radiation for Er having a wavelength between 1465 nm and 1495 nm.

42. The method of claim 39, wherein said step of feeding to said active fiber a second pump radiation includes feeding to said active fiber an exciting radiation for Yb having a wavelength between 1000 nm and 1100 nm.

43. The method of claim 39, wherein said active fiber includes a core and a cladding, and said step of feeding to said active fiber a first pump radiation and a second pump radiation includes feeding said first pump radiation and said second pump radiation into the core of said active fiber.

44. The method of claim 39, wherein said step of feeding the optical signals to the active fiber includes feeding to the active fiber optical signals having wavelength above 1565 nm.

45. The method of claim 44, wherein the active fiber optical signals fed to the active fiber extend over the long wavelength region from 1565 nm to 1620 nm.

46. An optical amplifying unit comprising:
an input for the input of optical signals,
an output for the output of said optical signals,
an active fiber having a core codoped throughout with Er and Yb, optically connected to said input and said output, for amplifying said optical signals,
a first and a second pump source for generating a first and, respectively, a second pump radiation, and
a first and a second optical coupler for optically coupling said first pump source and, respectively, said second pump source to said active fiber.
wherein said first pump radiation includes an excitation wavelength for Er, said second pump radiation includes an excitation wavelength for Yb, and the first pump radiation and the second pump radiation are fed throughout the core to excite Er and Yb, respectively.

47. The optical amplifying unit of claim 46, wherein the excitation wavelength for Er is between 1465 nm and 1495 nm and the excitation wavelength for Yb is between 1000 nm and 1100 nm.

48. The optical amplifying unit of claim 46, wherein said first optical coupler is connected between said input and said active fiber for feeding the first pump radiation to the active fiber in a co-propagating direction with respect to optical signals and second optical coupler is connected between said active fiber and said output for feeding the second pump radiation to the active fiber in a counter-propagating direction with respect to the optical signals.

49. The optical amplifying unit of claim 46, wherein said active fiber is a single-cladding and a single-mode fiber.

50. The optical amplifying unit of claim 46, wherein said first optical coupler is a micro-optic WDM coupler.

51. The optical amplifying unit of claim 46, wherein the second optical coupler is fused-fiber WDM coupler.

52. The optical amplifying unit of claim 46, wherein said second pump source comprises a fiber laser including a further active fiber and adapted to generate said second pump radiation, and a pump laser source adapted to pump said further active fiber.

53. The optical amplifying unit of claim 52, wherein said further active fiber includes a double-cladding fiber.

54. The optical amplifying unit of claim 52, wherein said further active fiber includes an optical fiber doped with Yb.

55. The optical amplifying unit of claim 52, wherein said fiber laser includes a first and a second Bragg grating written on opposite end portions of said further active fiber.

56. The optical amplifying unit of claim 52, wherein said pump laser source is a broad-area laser diode.

* * * * *